(12) United States Patent
Hu et al.

(10) Patent No.: US 11,271,864 B2
(45) Date of Patent: Mar. 8, 2022

(54) TUNNEL ESTABLISHMENT METHOD, APPARATUS, AND SYSTEM

(71) Applicant: HUAWEI TECHNOLOGIES CO., LTD., Guangdong (CN)

(72) Inventors: Zhibo Hu, Beijing (CN); Junda Yao, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/081,274

(22) Filed: Oct. 27, 2020

(65) Prior Publication Data
US 2021/0044538 A1 Feb. 11, 2021

Related U.S. Application Data

(63) Continuation of application No. PCT/CN2019/084033, filed on Apr. 24, 2019.

(30) Foreign Application Priority Data

Apr. 28, 2018 (CN) .......................... 201810405028.1

(51) Int. Cl.
*G06F 15/16* (2006.01)
*H04L 47/724* (2022.01)
(Continued)

(52) U.S. Cl.
CPC ........ *H04L 47/724* (2013.01); *H04L 12/4633* (2013.01); *H04L 45/507* (2013.01); *H04L 47/825* (2013.01)

(58) Field of Classification Search
CPC . H04L 47/724; H04L 12/4633; H04L 45/507; H04L 47/825
See application file for complete search history.

(56) References Cited

U.S. PATENT DOCUMENTS 9,794,148 B1 * 10/2017 Ramachandran ....... H04L 45/22
10,069,725 B1 * 9/2018 Talur ....................... H04L 45/50
(Continued)

FOREIGN PATENT DOCUMENTS

CN 105323176 A 2/2016
CN 105791108 A 7/2016
(Continued)

OTHER PUBLICATIONS

J.P. Vasseur et al.,"IGP Routing Protocol Extensions for Discovery of Traffic Engineering Node Capabilities", Network Working Group, Request for Comments: 5073, Dec. 2007, total 13 pages.
(Continued)

*Primary Examiner* — Hieu T Hoang
(74) *Attorney, Agent, or Firm* — Womble Bond Dickinson (US) LLP

(57) ABSTRACT

This application describes a tunnel establishment method. The method may include receiving, by a first network device, a first request message sent by a previous-hop network device, where the first request message is used to request to obtain an RSVP-TE label of the first network device, the first network device supports RSVP-TE and SR-TE, and the previous-hop network device supports RSVP-TE. The method may also include that when the first network device determines that at least one network device in downstream network devices of the first network device on a path of a to-be-established tunnel supports SR-TE, establishing an SR-TE tunnel from the first network device to a second network device in the at least one network device, and generating a tunnel identifier used to identify the SR-TE tunnel. Furthermore, the method may include sending, by the first network device, a first response message to the previous-hop network device, where the first response message includes the tunnel identifier.

9 Claims, 13 Drawing Sheets

(51) Int. Cl.
H04L 12/46 (2006.01)
H04L 45/50 (2022.01)
H04L 47/70 (2022.01)

(56) References Cited

U.S. PATENT DOCUMENTS

| | | | | |
|---|---|---|---|---|
| 2015/0103844 | A1* | 4/2015 | Zhao | H04L 45/028 |
| | | | | 370/410 |
| 2015/0249593 | A1* | 9/2015 | Alvarez | H04L 41/0803 |
| | | | | 370/241 |
| 2016/0021000 | A1* | 1/2016 | Previdi | H04L 45/507 |
| | | | | 370/392 |
| 2016/0277290 | A1* | 9/2016 | Sivabalan | H04L 45/50 |
| 2017/0149685 | A1* | 5/2017 | Wu | H04L 45/34 |
| 2017/0346718 | A1* | 11/2017 | Psenak | H04L 45/02 |
| 2018/0167458 | A1* | 6/2018 | Ould-Brahim | H04L 43/0882 |
| 2019/0058615 | A1* | 2/2019 | Rokui | H04L 12/4641 |
| 2019/0075048 | A1* | 3/2019 | Palle | H04L 49/25 |
| 2019/0245787 | A1* | 8/2019 | Skalecki | H04L 43/0882 |
| 2020/0153732 | A1* | 5/2020 | Negi | H04L 45/12 |
| 2020/0153733 | A1* | 5/2020 | Chunduri | H04L 45/38 |
| 2020/0213223 | A1* | 7/2020 | Peng | H04L 47/72 |
| 2020/0351197 | A1* | 11/2020 | Zhan | H04L 12/46 |

FOREIGN PATENT DOCUMENTS

| | | |
|---|---|---|
| CN | 107306222 A | 10/2017 |
| WO | 2017141079 A1 | 8/2017 |
| WO | 2017198319 A1 | 11/2017 |

OTHER PUBLICATIONS

A. Farrel et al, Interconnection of Segment Routing Domains—Problem Statement andSolution Landscape raft-farrel-spring-sr-domain-interconnect-03, IETF, Jan. 6, 2018, 34 pages, XP015125048.

* cited by examiner

TUNNEL ESTABLISHMENT METHOD, APPARATUS, AND SYSTEM

CROSS-REFERENCE TO RELATED APPLICATIONS

This application is a continuation of International Application No. PCT/CN2019/084033, filed on Apr. 24, 2019, which claims priority to Chinese Patent Application No. 201810405028.1, filed on Apr. 28, 2018. The disclosures of the aforementioned applications are hereby incorporated by reference in their entireties.

TECHNICAL FIELD

This application relates to the field of communications technologies, and in particular, to a tunnel establishment method, apparatus, and system.

BACKGROUND

Resource reservation protocol-traffic engineering (RSVP-TE) is a multiprotocol label switching (MPLS)-TE tunneling technology using RSVP. After an ingress node at a portal of a tunnel completes path calculation based on a constrained shortest path first (CSPF) routing protocol, the ingress node of the tunnel generates a path message carrying label request information. The path message is sent to an egress node at an end of the tunnel hop by hopping along a path obtained through calculation by using the CSPF routing protocol, and is used by each node to obtain a label of a next-hop node from the next-hop node. During subsequent packet forwarding, a packet is forwarded based on the label of the next-hop node.

Segment routing-traffic engineering (SR-TE) is a new MPLS TE tunneling technology that uses the interior gateway protocol (IGP) or the border gateway protocol (BGP) as control signaling. A controller calculates a forwarding path for the tunnel and delivers a label stack strictly corresponding to the path to a forwarder. On an ingress node of an SR-TE tunnel, the forwarder can control a transmission path of a packet on a network based on the label stack.

In prior approaches, when network nodes are configured, some nodes support RSVP, some nodes support the SR protocol, and some nodes support both RSVP and the SR protocol. In this scenario, how the node supporting RSVP establishes a tunnel with the node supporting the SR protocol by using the node supporting both RSVP and the SR protocol needs to be researched.

SUMMARY

This application provides a tunnel establishment method, apparatus, and system, to resolve problems that arise when a node supporting an RSVP cannot establish, by using a node supporting both the RSVP and an SR protocol, a tunnel with a node supporting the SR protocol.

According to a first aspect, an embodiment of this application provides a tunnel establishment method, including: receiving, by a first network device, a first request message sent by a previous-hop network device, where the first request message is used to request to obtain a resource reservation protocol-traffic engineering RSVP-TE label of the first network device, the first request message includes path information of the to-be-established tunnel, the path information of the to-be-established tunnel is used to indicate a path of the to-be-established tunnel, the previous-hop network device is a previous-hop network device of the first network device on the path of the to-be-established tunnel, the first network device supports RSVP-TE and segment routing-traffic engineering SR-TE, and the previous-hop network device supports RSVP-TE; when the first network device determines that at least one network device in downstream network devices of the first network device on the path of the to-be-established tunnel supports SR-TE, establishing an SR-TE tunnel from the first network device to a second network device in the at least one network device, and generating a tunnel identifier used to identify the SR-TE tunnel, where the first network device is an ingress network device of the SR-TE tunnel, and the second network device is an egress network device of the SR-TE tunnel; and sending, by the first network device, a first response message to the previous-hop network device, where the first response message includes the tunnel identifier, and the tunnel identifier is used as the RSVP-TE label of the first network device.

The foregoing solution provides a tunnel establishment manner in a scenario in which an RSVP-TE tunnel traverses an SR-TE tunnel or an RSVP-TE tunnel is stitched to an SR-TE tunnel, thereby enriching a networking scenario in which an RSVP-TE node and an SR-TE node are deployed.

In a possible embodiment, the establishing an SR-TE tunnel from the first network device to a second network device in the at least one network device, and generating a tunnel identifier used to identify the SR-TE tunnel includes: obtaining, by the first network device based on the path information of the to-be-established tunnel, at least one adjacency label corresponding to every two adjacent nodes on the SR-TE tunnel between the first network device and the second network device; generating, by the first network device, a label stack list of the SR-TE tunnel based on the at least one adjacency label, and generating the tunnel identifier mapped to the label stack list; and storing, by the first network device, an association relationship between the tunnel identifier and the label stack list.

The foregoing embodiment provides a simple and effective manner of establishing an SR-TE tunnel in a scenario in which an RSVP-TE tunnel traverses an SR-TE tunnel or an RSVP-TE tunnel is stitched to an SR-TE tunnel.

In a possible embodiment, the second network device is an egress network device of the to-be-established tunnel, and none of the at least one network device supports RSVP-TE.

The foregoing embodiment indicates that this embodiment of this application is applicable to a scenario in which RSVP-TE is stitched to SR-TE.

In a possible embodiment, only the second network device in the at least one network device supports RSVP-TE, and the second network device is an intermediate network device on the to-be-established tunnel; and before the sending, by the first network device, a first response message to the previous-hop network device, the method further includes: sending, by the first network device, a second request message to the second network device through the SR-TE tunnel, where the second request message is used to request to obtain an RSVP-TE label of the second network device; and receiving, by the first network device, a second response message sent by the second network device, where the second response message includes the RSVP-TE label of the second network device.

The foregoing embodiment indicates that this embodiment of this application is further applicable to a scenario in which an RSVP-TE tunnel traverses an SR-TE tunnel.

In a possible embodiment, the method further includes: receiving, by the first network device, a packet sent by the previous-hop network device, where the packet carries the tunnel identifier; and replacing, by the first network device, the tunnel identifier in the packet with the label stack list based on the association relationship between the tunnel identifier and the label stack list, and sending an updated packet to a next-hop network device of the first network device on the to-be-established tunnel.

The foregoing embodiment provides a simple and effective manner for packet sending when an RSVP-TE tunnel traverses or is stitched to an SR-TE tunnel.

In a possible embodiment, when only the second network device in the at least one network device supports RSVP-TE, and the second network device is the intermediate network device on the to-be-established tunnel, after the first network device replaces the tunnel identifier in the packet with the label stack list, the method further includes: encapsulating, by the first network device, the RSVP-TE label of the second network device at the bottom of the label stack list in the packet.

The foregoing embodiment provides another simple and effective manner for packet sending when an RSVP-TE tunnel traverses an SR-TE tunnel.

According to a second aspect, an embodiment of this application provides a tunnel establishment method, including: sending, by a network device, a request message to a next-hop network device on a to-be-established tunnel, where the request message is used to request to obtain a resource reservation protocol-traffic engineering RSVP-TE label of the next-hop network device, the first request message includes path information of the to-be-established tunnel, the path information of the to-be-established tunnel is used to indicate a path of the to-be-established tunnel, the next-hop network device is a next-hop network device of the network device on the path of the to-be-established tunnel, the network device supports RSVP-TE, and the next-hop network device supports RSVP-TE and segment routing-traffic engineering SR-TE; and receiving, by the network device, a response message sent by the next-hop network device, where the response message includes a tunnel identifier used as the RSVP-TE label of the network device, and the tunnel identifier is used to identify an SR-TE tunnel established by the next-hop network device on the path of the to-be-established tunnel.

The foregoing solution provides a tunnel establishment manner in a scenario in which an RSVP-TE tunnel traverses an SR-TE tunnel or an RSVP-TE tunnel is stitched to an SR-TE tunnel, thereby enriching a networking scenario in which an RSVP-TE node and an SR-TE node are deployed.

In a possible embodiment, the method further includes: when the network device sends a packet to the next-hop network device, adding the tunnel identifier used as the RSVP-TE label of the next-hop network device to the packet, and sending the packet to the next-hop network device.

The foregoing embodiment provides a packet sending manner in a scenario in which an RSVP-TE tunnel traverses an SR-TE tunnel or an RSVP-TE tunnel is stitched to an SR-TE tunnel.

According to a third aspect, based on a same inventive concept as the method embodiment of the first aspect, an embodiment of this application provides a tunnel establishment apparatus. The apparatus is applied to the first network device in the first aspect, in other words, the apparatus may be the first network device, or may be a chip that can be applied to the first network device. The apparatus has a function of implementing the embodiments in the first aspect. The function may be implemented by hardware, or may be implemented by hardware by executing corresponding software. The hardware or the software includes one or more modules corresponding to the foregoing functions.

According to a fourth aspect, based on a same inventive concept as the method embodiment provided in the second aspect, an embodiment of this application provides a tunnel establishment apparatus. The apparatus is applied to the network device in the second aspect, in other words, the apparatus may be the network device, or may be a chip that can be applied to the network device. The apparatus has a function of implementing the embodiments in the first aspect. The function may be implemented by hardware, or may be implemented by hardware by executing corresponding software. The hardware or the software includes one or more modules corresponding to the foregoing functions.

According to a fifth aspect, an embodiment of this application provides an apparatus, including a processor and a memory, where the memory is configured to store an instruction. When the apparatus runs, the processor executes the instruction stored in the memory, so that the apparatus performs the tunnel establishment method in any one of the first aspect or the embodiments of implementation methods of the first aspect. It should be noted that the memory may be integrated into the processor, or may be independent of the processor. The apparatus may further include a bus. The processor is coupled to the memory by using the bus. The memory may include a read-only memory and a random access memory. When the apparatus needs to run, a basic input/output system cured in the read-only memory or a bootloader system in an embedded system is used for startup, so that the apparatus enters a normal running state. After entering the normal running state, the apparatus runs an application program and an operating system in the random access memory, so that the processor performs the method in any one of the first aspect or the possible implementation embodiments of the first aspect.

According to a sixth aspect, an embodiment of this application provides an apparatus, including a processor and a memory, where the memory is configured to store an instruction. When the apparatus runs, the processor executes the instruction stored in the memory, so that the apparatus performs the tunnel establishment method in any one of the second aspect or the embodiments of implementation methods of the second aspect. It should be noted that the memory may be integrated into the processor, or may be independent of the processor. The apparatus may further include a bus. The processor is coupled to the memory by using the bus. The memory may include a read-only memory and a random access memory. When the apparatus needs to run, a basic input/output system cured in the read-only memory or a bootloader system in an embedded system is used for startup, so that the apparatus enters a normal running state. After entering the normal running state, the apparatus runs an application program and an operating system in the random access memory, so that the processor performs the method in any one of the second aspect or the possible implementation embodiments of the second aspect.

According to a seventh aspect, an embodiment of this application further provides a system, including the first network device in the third aspect or the fifth aspect and the network device in the fourth aspect or the sixth aspect. In a possible embodiment, the system may further include another network device that interacts with the above two types of network devices in the solution provided in the embodiments of this application, for example, another network device on the path of the to-be-established tunnel.

According to an eighth aspect, an embodiment of this application further provides a readable storage medium, where the readable storage medium stores a program or an instruction, and when the program or the instruction runs on a computer, the tunnel establishment method in any one of the foregoing aspects is performed.

According to a ninth aspect, an embodiment of this application further provides a computer program product including an instruction. When the computer program product runs on a computer, the computer is enabled to perform the tunnel establishment method in any one of the foregoing aspects.

In addition, for technical effects brought by any embodiment in the third to the ninth aspects, refer to technical effects brought by embodiments of different implementations in the first aspect to the second aspect. Details are not described herein.

DESCRIPTION OF EMBODIMENTS

This application and embodiments discussed herein are applied to a hybrid networking scenario in which a node supporting SR-TE and a node supporting RSVP-TE are deployed.

In an embodiment of this application, a node may also be referred to as a network device. The network device is a device that provides a routing and forwarding function in a network, for example, may be a router, a switch, a forwarder, or a label switching router (LSR). This is not limited. In a subsequent description process, the node is used as an example for description.

Figure 1:
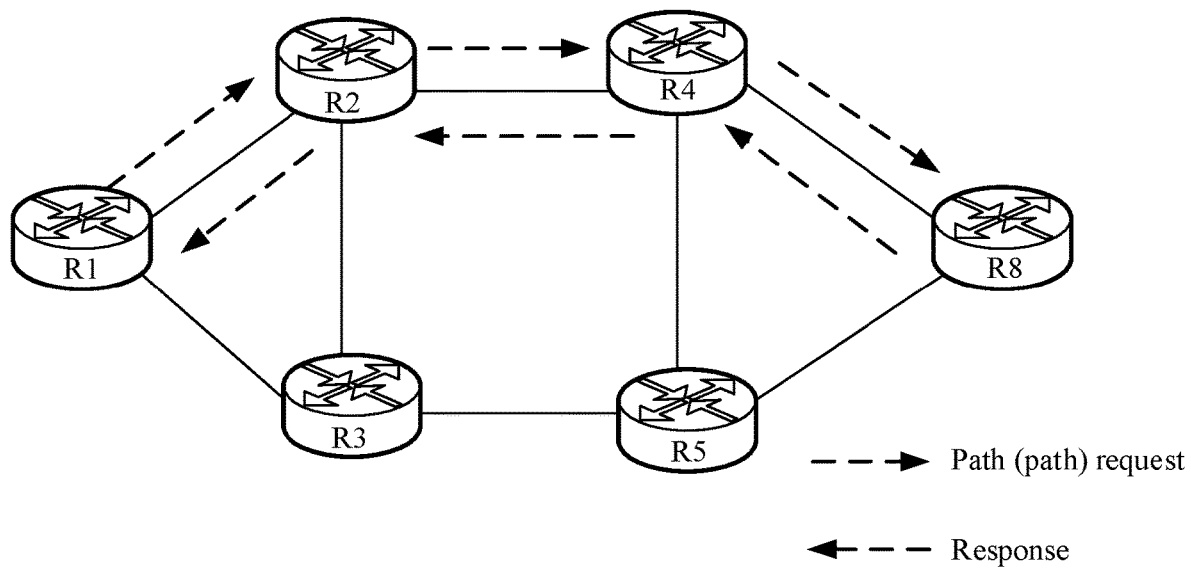
FIG. 1 is a schematic diagram of a working principle of RSVP-TE according to an embodiment of this application.

The following uses FIG. 1 as an example to briefly describe a working principle of RSVP-TE, and uses an example of establishing a tunnel from a node R1 to a node R8.

The ingress node R1 calculates a path for an RSVP-TE tunnel by using CSPF based on constraints configured for the RSVP-TE tunnel, such as a specified path, a bandwidth constraint, and a link color. The following uses a path R1→R2→R4→R8 as an example. After path calculation is completed, the ingress node R1 sends an RSVP path message to the destination node (which may also be referred to as an egress node, a last node, or a tail node) R8, where the RSVP path message is used to request to obtain a label of a node in a downstream direction and apply for reserved resources. The downstream node that receives the RSVP path message, for example, the R2, first checks whether a message format is correct, and then checks whether the reserved resources applied in the path message can be satisfied. This process may be referred to as admission control.

After admission control succeeds, each downstream node generates a new path message and sends the new path message to a next-hop node. For example, the R2 sends a new path message to an R3, and the R3 sends a new path message to the R4. This process continues until the last node, namely, the egress node. After receiving a path message sent by a previous hop, the egress node R8 verifies whether reserved resources applied in the path message can be satisfied. If the reserved resources can be satisfied, the egress node R8 responds with an RSVP response message (such as an RSVP resv message) and reserves the corresponding resources. The RSVP resv message is also sent hop by hop along the path, and carries information such as an RSVP label and reserved resources. For example, an RSVP resv message sent by the R4 to the R3 carries an RSVP label of the R4. When the ingress node R1 receives an RSVP resv message, the tunnel is successfully established. An LSP established by using RSVP-TE has a resource reservation function. Nodes along the LSP can allocate resources to the LSP to ensure a service transmitted on the LSP.

Figure 2:
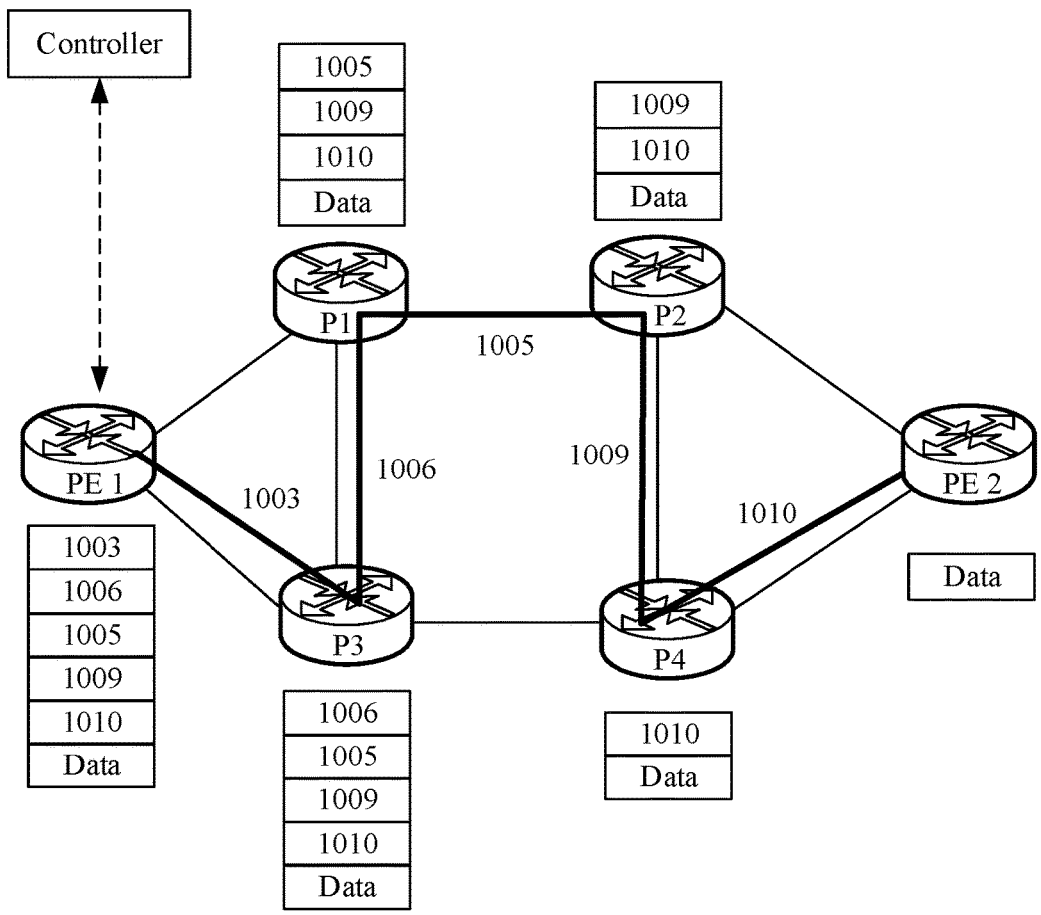
FIG. 2 is a schematic diagram of a working principle of SR-TE according to an embodiment of this application.

The following uses FIG. 2 as an example to briefly describe a working principle of SR-TE.

In an SR-TE technology, a control plane uses the link-state IGP protocol or the border gateway protocol (BGP) to distribute an MPLS label of a node, and a data plane forwards an MPLS packet based on the label distributed by the control plane.

SR-TE is a new TE tunneling technology that uses the interior gateway protocol (IGP) or the border gateway protocol (BGP) protocol as control signaling. A controller calculates a forwarding path for a tunnel and delivers a label stack list strictly mapped to the path to a forwarder. On an ingress node of an SR-TE tunnel, the forwarder can control a transmission path of a packet on a network based on the label stack list.

The label stack list includes an adjacency label corresponding to each link on a forwarding path.

An adjacency label, or Adjacency Segment, is used to identify a routing link on an SR network and is a label type mainly used by SR-TE. The adjacency segment can be identified by an adjacency segment ID (SID). The adjacency label is directional, and is valid only on a source node locally when being used for providing guidance for packet forwarding. As shown in FIG. 2, an adjacency label 1003 corresponds to a link PE 1→P3, and a source node is the PE 1. An adjacency label 1004 corresponds to a link P3→PE 1, and a source node is the P3.

The label stack list is an ordered set of adjacency labels and is used to identify a complete label switched path LSP. Each adjacency label in the label stack list identifies a specific link. The entire label stack list successively identifies all links along the entire LSP from a stack top to a stack bottom. In a packet forwarding process, a corresponding link is searched based on an adjacency label at the top of the stack in the label stack list, and a packet is forwarded after the label is removed. After all adjacency labels in the label stack list are removed, the packet passes through the entire LSP and reaches a destination of the SR-TE tunnel.

The forwarder allocates the adjacency labels based on the IGP protocol and reports the allocated adjacency labels to the controller, so that the controller generates the label stack list based on the adjacency labels.

The adjacency labels are flooded to the entire network by using the IGP protocol. As shown in FIG. 2, a device P3 is used as an example. A specific process of allocating adjacency labels by using the IGP protocol is as follows.

The P3 applies for local dynamic labels for all links of the P3 by using the IGP protocol (for example, the P3 allocates a link label 1002 to a link P3→P4). The P3 advertises the adjacency labels and floods the adjacency labels to the entire network by using the IGP protocol. Another device on the network learns, by using the IGP protocol, of the adjacency labels advertised by the P3. Specifically, the PE 1, PE 2, a P1, a P2, and a P4 allocate and advertise adjacency labels in a manner of P3, and flood the adjacency labels to another device on the network.

The controller calculates a path based on constraint attributes of the SR-TE tunnel. After obtaining the path through calculation, the controller combines adjacency labels of the entire path based on a topology and the adjacency labels to generate a label stack list. For example, as shown in FIG. 2, the controller obtains, through calculation, the path of the SR-TE tunnel: PE 1->P3→P1→P2→P4→PE 2, and the corresponding label stack list is {1003, 1006, 1005, 1009, 1010}. The controller delivers the label stack list obtained through calculation to the ingress node PE 1 of the forwarder. The forwarder then obtains an LSP of the SR-TE tunnel based on the label stack list delivered by the controller.

The forwarder performs a label operation on the packet based on the label stack list corresponding to the LSP of the SR-TE tunnel, and searches for a forwarding outbound interface based on a topmost label hop by hop, to provide guidance for forwarding the data packet to a destination address of the tunnel.

When the packet enters the SR-TE tunnel, the ingress node adds a label stack list to the packet. When the packet is forwarded through the SR-TE tunnel, after the forwarding outbound interface is found based on the topmost label, the ingress node removes the topmost label. For example, as shown in FIG. 2, the ingress node PE 1 adds a label stack list {1003, 1006, 1005, 1009, 1010} to the data packet, then performs link matching based on the topmost label 1003, finds that a corresponding forwarding outbound interface is a link PE 1→P3, and then removes the label 1003. The packet carries a label stack {1006, 1005, 1009, 1010} and is forwarded to a next-hop node P3 through the link PE 1→P3. After receiving the packet, the intermediate node P3 performs link matching based on the topmost label 1006, finds that a corresponding forwarding outbound interface is a link P3→P1, and then removes the label 1006. By analogy, after receiving the packet, the nodes P1, P2, and P4 continuously forward the packet in the same manner as the P3. Until the node P4 removes the last label 1010, the data packet is forwarded to the node F. The egress node PE 2 receives a packet carrying no label and forwards the packet by searching a routing table.

In addition, it should be noted that "a plurality of" in the embodiments of this application means two or more. The term "and/or" describes an association relationship for describing associated objects and represents that three relationships may exist. For example, A and/or B may represent the following three cases: Only A exists, both A and B exist, and only B exists. In addition, it should be understood that, in the description of this application, terms such as "first" and "second" are merely used for a purpose of distinguishing between descriptions, but cannot be understood as indication or implication of relative importance, and cannot be understood as an indication or implication of a sequence. The node 1, the node 2, or the like is also merely used to distinguish between described nodes, and cannot be understood as an indication or implication of relative importance, and cannot be understood as an indication or implication of a sequence.

Figure 3A:
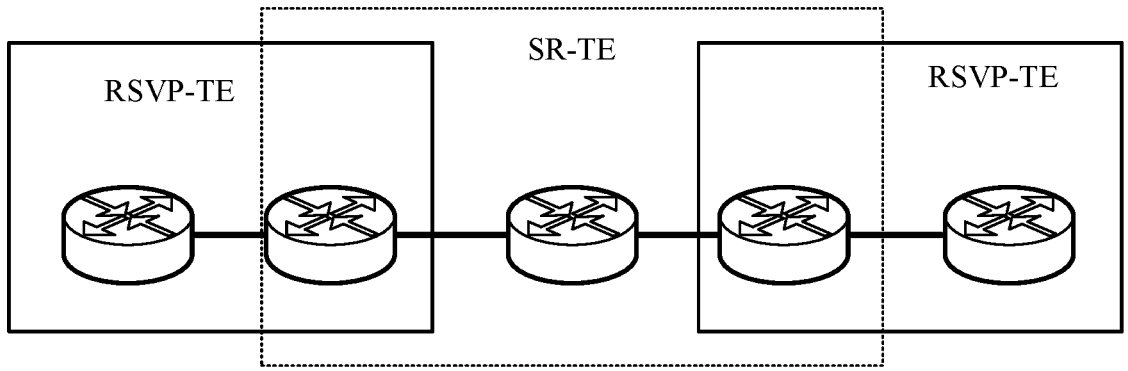
FIG. 3A is a schematic diagram of an architecture in which an RSVP-TE tunnel traverses an SR-TE tunnel according to an embodiment of this application.
Figure 3B:
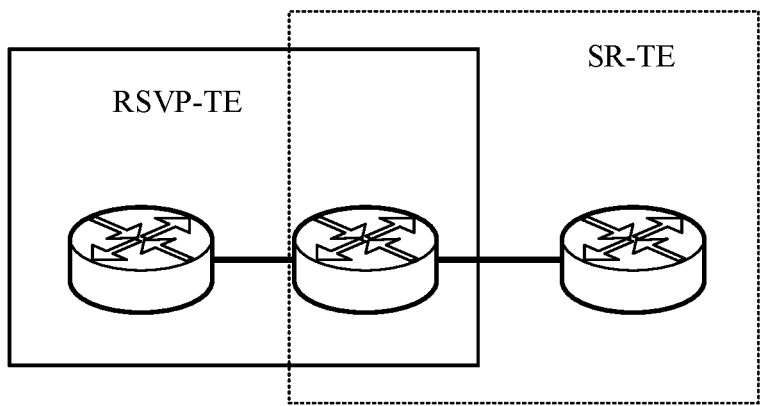
FIG. 3B is a schematic diagram of an architecture in which an RSVP-TE tunnel is stitched to an SR-TE tunnel according to an embodiment of this application.
Figure 3C:
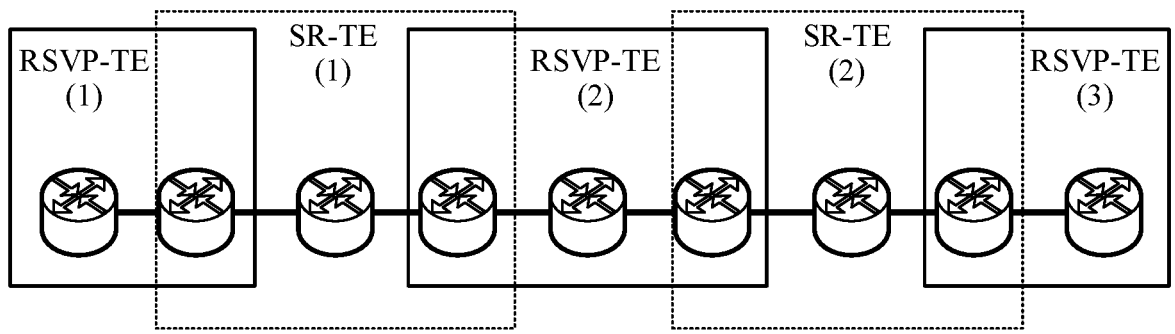
FIG. 3C is a schematic diagram of an architecture in which a plurality of RSVP-TE tunnels traverse a plurality of SR-TE tunnels according to an embodiment of this application.

In a hybrid networking scenario of a node supporting SR-TE and a node supporting RSVP-TE, how an RSVP-TE tunnel traverses or is stitched to an SR-TE tunnel to establish a hybrid tunnel including the RSVP-TE tunnel and the SR-TE tunnel needs to be studied. For example, referring to FIG. 3A and FIG. 3B, FIG. 3A shows that an RSVP-TE domain traverses an SR-TE domain, and FIG. 3B shows that an RS-TE domain is stitched to an SR-TE domain. A quantity of nodes in each domain is not specifically limited. In addition, there may be three RSVP-TE domains that need to traverse two SR-TE domains, or more, as shown in FIG. 3C. That an RSVP-TE (1) and an RSVP-TE (2) need to traverse an SR-TE (1) may be implemented by using the tunnel establishment method provided in this embodiment of this application, and that the RSVP-TE (2) and an RSVP-TE (3) need to traverse an SR-TE (2) may be implemented by using the tunnel establishment method provided in this embodiment of this application.

Based on this, the embodiments of this application provide a tunnel establishment method, apparatus, and system, to implement that an RSVP-TE tunnel traverses or is stitched to an SR-TE tunnel to establish a hybrid tunnel including the RSVP-TE tunnel and the SR-TE tunnel. Embodiments of the method and the apparatus are based on the same inventive concept. Because a problem-resolving principle of the method is similar to that of the apparatus, embodiments and implementations of the apparatus and the method may mutually refer to each other. No repeated description is provided.

Figure 4:
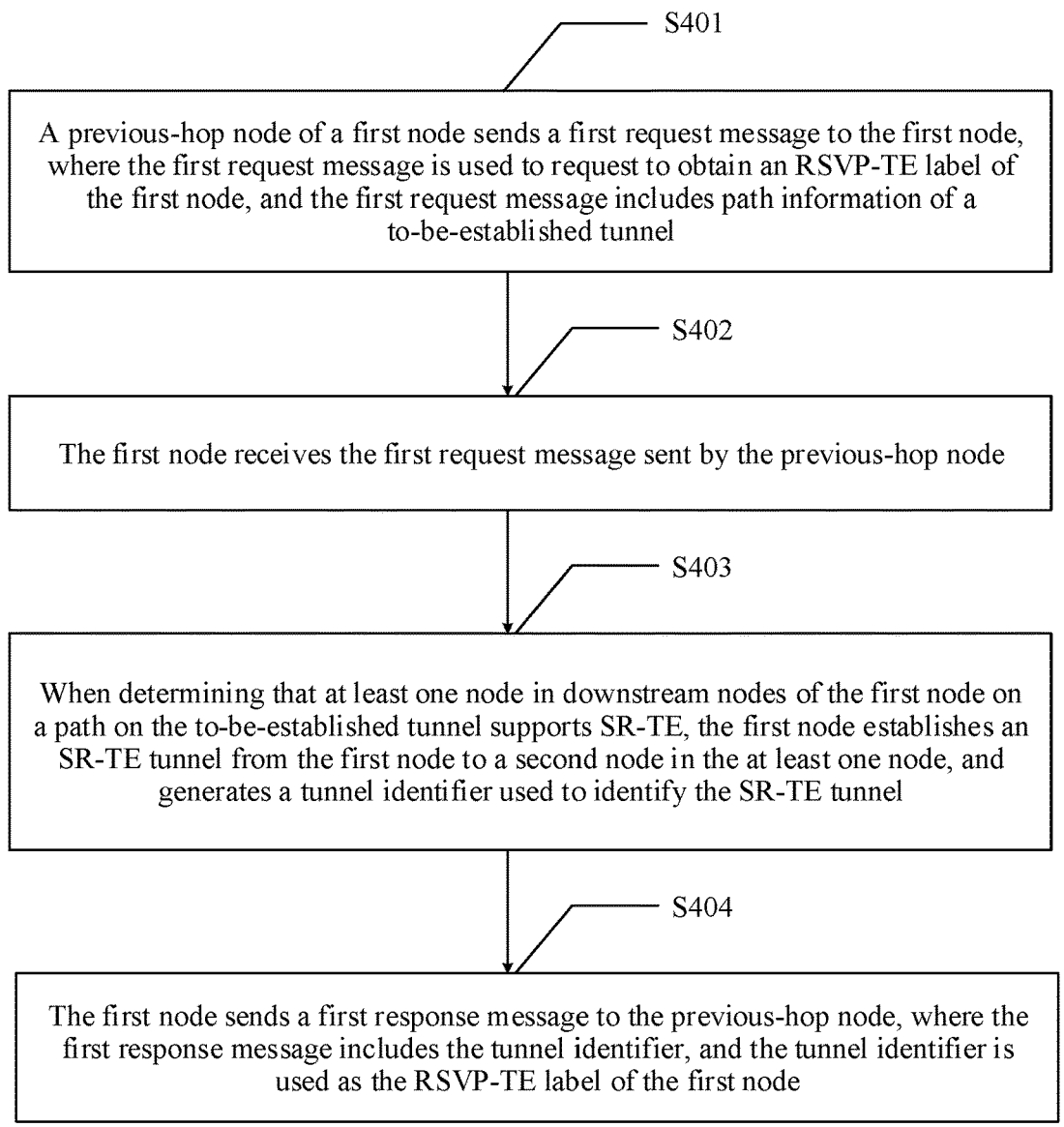
FIG. 4 is a flowchart of a tunnel establishment method according to an embodiment of this application.

FIG. 4 is a schematic flowchart of a tunnel establishment method according to an embodiment of this application. For example, a to-be-established tunnel includes N nodes, where a node 1 in the middle supports RSVP-TE and SR-TE. A previous-hop node of the first node does not support SR-TE, and supports only RSVP-TE. On a path of the to-be-established tunnel, at least one node in downstream nodes of the first node supports SR-TE. For example, if one node in a downstream direction of the first node supports SR-TE, in the downstream direction on the to-be-established tunnel, a next-hop node of the first node supports SR-TE. If two nodes in the downstream direction support SR-TE, the two nodes are two adjacent nodes, and one of the two nodes is adjacent to the first node. In other words, a next-hop node of the first node supports SR-TE, and a next-hop node of the next-hop node also supports SR-TE. For example, when A is connected to B and B is connected to C, a next-hop node of a next-hop node of A is C on a path A→B→C.

For ease of subsequent description, a last node that supports SR-TE and that is in the downstream nodes of the first node is referred to as a second node.

It should be noted that, in this embodiment of this application, an upstream and a downstream are described based on a direction in which a data packet is transmitted on a tunnel. The to-be-established tunnel is a tunnel in a direction from an ingress node to an egress node, and the data packet is transmitted on a path of the tunnel. The ingress node is an upstream node of the egress node, and on the contrary, the egress node is a downstream node of the ingress node. If there is further an intermediate node between the ingress node and the egress node on the path of the to-be-established tunnel, the intermediate node is a downstream node of the ingress node relative to the ingress node, and the intermediate node is an upstream node of the egress node relative to the egress node.

S401. The previous-hop node of the first node sends a first request message to the first node, where the first request message is used to request to obtain an RSVP-TE label of the first node, and the first request message includes path information of the to-be-established tunnel.

The path information of the to-be-established tunnel is used to indicate a path of the to-be-established tunnel.

S402. The first node receives the first request message sent by the previous-hop node.

S403. When the first node determines that at least one node in the downstream nodes of the first node on the path of the to-be-established tunnel supports SR-TE, establish an SR-TE tunnel from the first node to a second node in the at least one node, and generate a tunnel identifier used to identify the SR-TE tunnel.

A format of the tunnel identifier may be the same as a format of the RSVP label. The tunnel identifier may also be referred to as a binding segment identifier (BSID).

In this embodiment of this application, each node in an SR network advertises an SR capability of the node to an entire SR domain by using an IGP protocol extension, so that each SR node can automatically learn of another node that supports SR-TE.

The at least one node includes the next-hop node of the first node, and the second node is an egress node of the SR-TE tunnel. For example, when the at least one node is one node, the next-hop node of the first node is the second node; or when the at least one node is two nodes, for example, the next-hop node of the first node is a node X, the second node is a next-hop node of the node X.

S404. The first node sends a first response message to the previous-hop node, where the first response message includes the tunnel identifier, and the tunnel identifier is used as the RSVP-TE label of the first node.

The request message may be a path message, and the response message may be a resv message.

When this embodiment of this application is applied to a scenario in which RSVP-TE is stitched to SR-TE, the second node is an egress node of the to-be-established tunnel, and none of the at least one node supports RSVP-TE.

When this embodiment of this application is applied to a scenario in which an RSVP-TE tunnel traverses the SR-TE tunnel, only the second node in the at least one node supports RSVP-TE, and the second node is not an egress node of the to-be-established tunnel, in other words, the second node is an intermediate node of the to-be-established tunnel.

In this scenario, before the first node sends the first response message to the previous-hop node, the first node sends a second request message to the second node through the SR-TE tunnel, where the second request message is used to request to obtain an RSVP-TE label of the second node. The first node receives a second response message sent by the second node, where the second response message includes the RSVP-TE label of the second node.

The following separately describes the foregoing two scenarios with reference to specific instances and embodiments.

Figure 5:
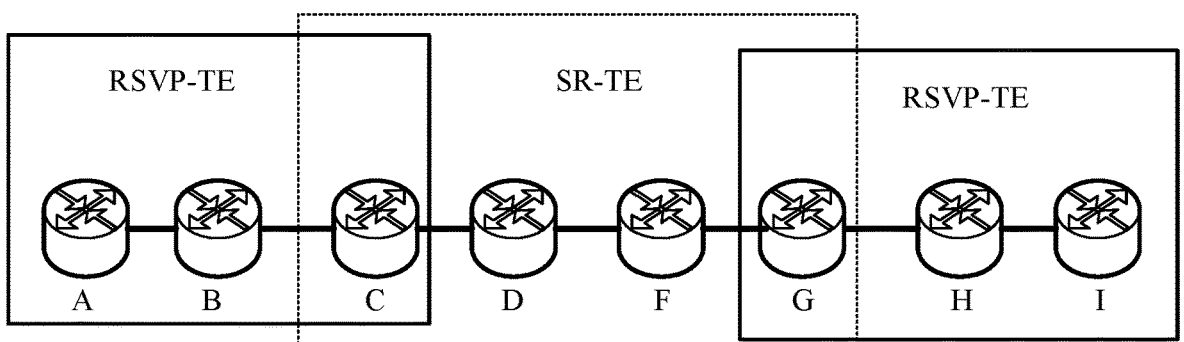
FIG. 5 is a schematic architectural diagram of a scenario in which an RSVP-TE tunnel traverses an SR-TE tunnel according to an embodiment of this application.

FIG. 5 shows the scenario in which the RSVP-TE tunnel traverses the SR-TE tunnel.

RSVP-TE nodes are nodes supporting RSVP-TE, and include a node A, a node B, a node H, and a node I. SR-TE nodes are nodes supporting SR-TE, and include a node D and a node F. RSVP-TE and SR-TE nodes are nodes supporting both RSVP-TE and SR-TE, and includes a node C and a node G. The node A is used as an ingress node of a to-be-established tunnel, and the node I is an egress node of the to-be-established tunnel.

Figure 6A:
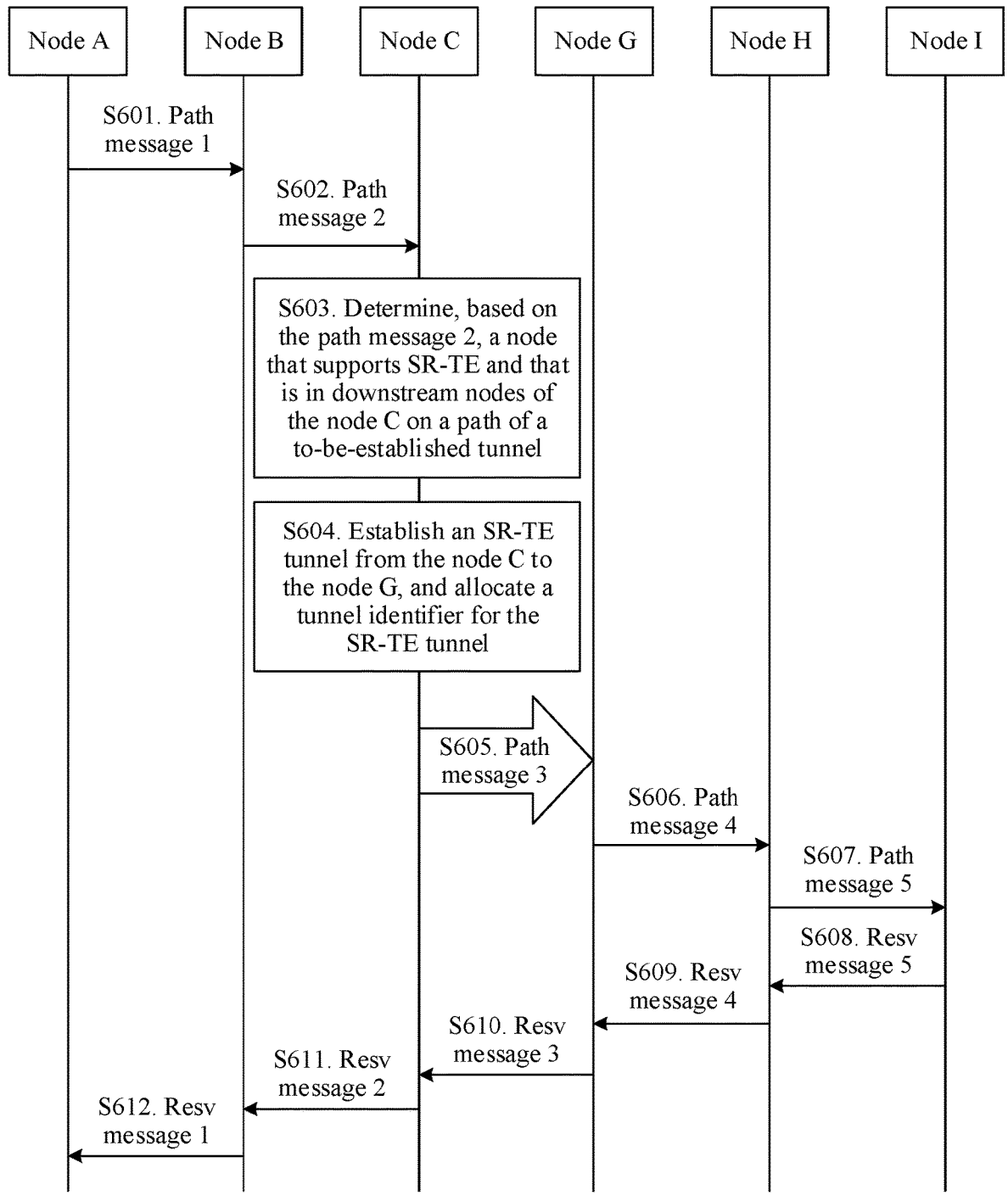
FIG. 6A and FIG. 6B are schematic flowcharts of a tunnel establishment method in a scenario in which an RSVP-TE tunnel traverses an SR-TE tunnel according to an embodiment of this application.
Figure 6B:
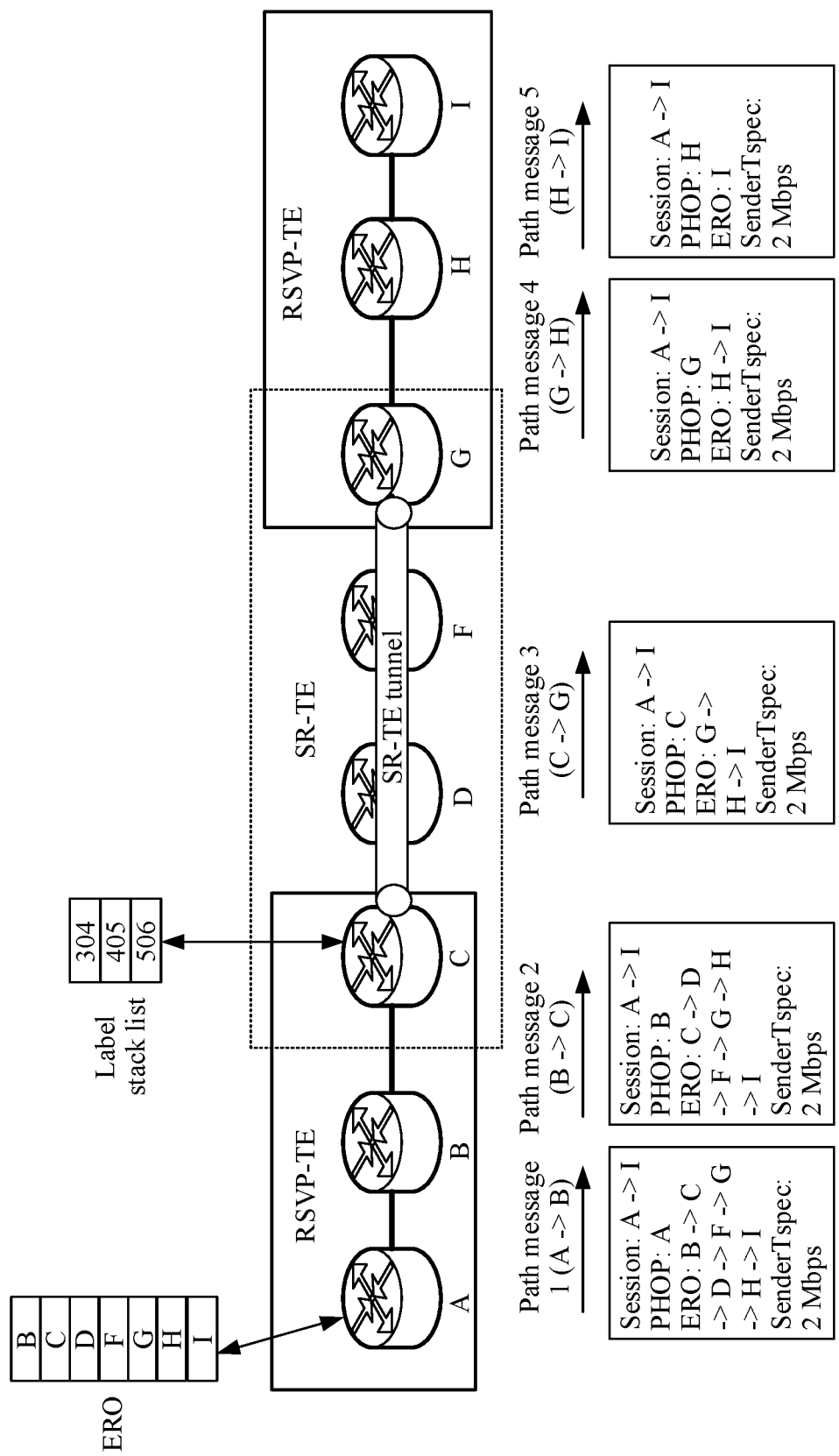

A specific tunnel establishment solution is shown in FIG. 6A and FIG. 6B.

The node A calculates a path for a to-be-established tunnel from the node A to the node I based on CSPF. The path specifies an IP address of each hop along the path. The path obtained through calculation is A→B→C→D→F→G→H→I. The node A uses an IP address list obtained through calculation based on CSPF as path information of the to-be-established tunnel, where the path information may be referred to as explicit route object (ERO) information. A path message (Msg) 1 is constructed based on the path information. Alternatively, the node A may trigger a controller to calculate a path from the node A to the node I based on CSPF, and then send an IP address list obtained through calculation that is used as ERO information to the node A, so that the node A constructs a path message 1 based on the received ERO information.

Content included in the path message 1 constructed by the node A is shown in Table 1. Content included in path messages shown in tables provided in this application is merely an example. Certainly, the path messages may also include other related information, for example, an address of a sender (which may be represented by using Sender_Template), and a passed route is recorded by using Record_Route. This is not specifically limited herein.

An object session includes information related to an RSVP session, including: a destination address, an entire established tunnel ID, an extended tunnel ID, and the like. PHOP indicates an address of an outbound interface of a previous-hop that sends a path message, in other words, an address of an outbound interface from the node A to the node B is an address of an outbound interface of the node A. Sender_Tspec indicates a traffic feature of a data flow, in other words, describes a requirement of a path, for example, if Sender_Tspec in Table 1 is configured to 2 Mbps, a 2-Mbps bandwidth needs to be reserved.

TABLE 1

| Object (object) | Value (value) |
|---|---|
| Session (session) | A -> I |
| PHOP | A |
| ERO | B -> C -> D -> F -> G -> H -> I |
| Sender_Tspec | 2 Mbps |

S601. The node A sends the constructed path message 1 to the node B based on the ERO.

S602. After receiving the path message 1, the node B updates the path message 1 to a path message 2, and sends the path message 2 to the node C.

Content included in the path message 2 is shown in Table 2. Specifically, the node B updates PHOP in the path message 1 to an address of an outbound interface from B to C, in other words, an address of B. The node B updates ERO in the path message 1 and deletes the address of the outbound interface of the node B.

TABLE 2

| Object (object) | Value (value) |
|---|---|
| Session (session) | A -> I |
| PHOP | B |
| ERO | C -> D -> F -> G -> H -> I |
| Sender_Tspec | 2 Mbps |

S603. After the node C receives the path message 2 sent by the node B, the node C determines, based on the path message 2, that there are nodes that support SR-TE and that are in downstream nodes of the node C on the path of the to-be-established tunnel, that is, the node D, the node F, and the node G.

On the path of the to-be-established tunnel, the node D is directly adjacent to the node C (or in other words, the node D is adjacent to the node C), the node F is directly adjacent to the node D, and the node G is directly adjacent to the node F. To be specific, there are the nodes in the downstream nodes of the node C support SR-TE, the nodes supporting SR-TE are successively adjacent to each other on the to-be-established tunnel, and an upmost stream node (for example, the node D) in the downstream nodes that support SR-TE and that are of the node C is directly adjacent to the node C.

Specifically, the node C may determine, based on the path message 2, that the node D and the node F on the to-be-established tunnel do not support RSVP-TE but support only SR-TE, and determine that the node G supports both SR-TE and RSVP-TE, thereby determining an SR-TE path from the node C to the node G.

When the node C determines that the node D and the node F on the path do not support RSVP-TE, a TE node capability descriptor extended by RFC 5073 may be used. FRC 5073 is a standard file related to an IGP routing protocol extensions for discovery of traffic engineering node capabilities.

S604. The node C establishes an SR-TE tunnel from the node C to the node G, and allocates a tunnel identifier for the SR-TE tunnel. When allocating the tunnel identifier, the node C may automatically allocate, from an SRLB (that is, an SR local block), a label that does not conflict with a label of another node.

The node C may establish the SR-TE tunnel from the node C to the node G by using the IGP protocol.

Specifically, the node C obtains at least one adjacency label corresponding to every two adjacent nodes on the SR-TE tunnel between the node C and the node G, in other words, includes an adjacency label used to represent a link between the node C and the node D, for example, 304, an adjacency label used to represent a link between the node D and the node F, for example, 405, and an adjacency label used to represent a link between the node F and the node G, for example, 506. Therefore, the node C generates a label stack list of the SR-TE tunnel based on the adjacency label, generates a tunnel identifier mapped to the label stack list, in other words, allocates the tunnel identifier for the SR-TE tunnel, and establishes an association relationship between the tunnel identifier and the label stack list. In this way, the node C establishes the SR-TE tunnel from the node C to the node G. The Node C stores the association relationship.

The path message 2 includes path information of the to-be-established tunnel A-I, and the path information is ERO information. ERO in the path message 2 includes IP routing information of D, F, and G, in other words, a path D→F→G. Therefore, when generating the label stack list based on the adjacency label, the node C may generate the label stack list of the SR-TE tunnel based on the ERO information and the obtained adjacency label, in other words, the label stack list is 304, 405, and 506 successively from a stack top to a stack bottom based on the path D→F→G.

S605. The node C updates the path message 2 to a path message 3, and sends the path message 3 to the node G through the SR-TE tunnel between the node C and the node G, in other words, sends the path message 3 to the node G based on the label stack list.

Content included in the path message 3 is shown in Table 3. Specifically, the node C updates PHOP in the path message 2 to an address of an outbound interface from C to G, in other words, an address of C. The node C updates ERO in the path message 2 and deletes the address of the outbound interface of the node C.

TABLE 3

| Object (object) | Value (value) |
|---|---|
| Session (session) | A -> I |
| PHOP | C |
| ERO | G -> H -> I |
| Sender_Tspec | 2 Mbps |

S606. After receiving the path message 3, the node G updates the path message 3 to a path message 4, and sends the path message 4 to the node H.

Content included in the path message 4 is shown in Table 4. Specifically, the node G updates PHOP in the path message 3 to an address of an outbound interface from G to H, in other words, an address of G. The node G updates ERO in the path message 3 and deletes the address of the outbound interface of the node G.

TABLE 4

| Object (object) | Value (value) |
|---|---|
| Session (session) | A -> I |
| PHOP | G |
| ERO | H -> I |
| Sender_Tspec | 2 Mbps |

S607. After receiving the path message 4, the node H updates the path message 4 to a path message 5, and sends the path message 5 to the node I.

Content included in the path message 5 is shown in Table 5. Specifically, the node H updates PHOP in the path message 4 to an address of an outbound interface from H to I, in other words, an address of an outbound interface of H. The node H updates ERO in the path message 4 and deletes the address of the outbound interface of the node H.

TABLE 5

| Object (object) | Value (value) |
| --- | --- |
| Session (session) | A -> I |
| PHOP | H |
| ERO | I |
| Sender_Tspec | 2 Mbps |

S608. After receiving the path message 5, the node I allocates an RSVP-TE label of the node I, adds the RSVP-TE label of the node I to a resv message 5, and sends the resv message 5 to the node H. The RSVP-TE label of the node I is a label allocated by the node I to the node H for identifying the node I.

The node I extracts the address of the outbound interface of H in the PHOP field from the received path message 5 as a destination IP address of the resv message. In addition, the resv message is forwarded along a reverse path. Therefore, the resv message does not carry the ERO field.

S609. After receiving the resv message 5, the node H allocates an RSVP-TE label of the node H, stores the RSVP-TE label of the node I in the resv message 5, and replaces the RSVP-TE label of the node I in the resv message 5 with the RSVP-TE label of the node H. Therefore, the resv message 5 is updated to a resv message 4, and the resv message 4 is sent to the node G.

Similarly, in S610, after receiving the resv message 4, the node G allocates an RSVP-TE label of the node G, stores the RSVP-TE label of the node H in the resv message 4, and replaces the RSVP-TE label of the node H in the resv message 4 with the RSVP-TE label of the node G, so that the resv message 4 is updated to a resv message 3, and the resv message 3 is sent to the node C. Specifically, the node G determines an IP address of the node C based on a record route object (PRO), and sends the resv message 3 to the node C based on the IP address of the node C. A PRO record route list records an IP address of each node that sends the path message on the RSVP-TE tunnel.

S611. After receiving the resv message 3, the node C stores the RSVP-TE label of the node G in the resv message 3, and replaces the RSVP-TE label of the node G in the resv message 3 with a tunnel identifier (the tunnel identifier is used as an RSVP-TE label of the node C), so that the resv message 3 is updated to a resv message 2, and the resv message 2 is sent to the node B.

S612. After receiving the resv message 2, the node B allocates an RSVP-TE label to the node B, stores the tunnel identifier in the resv message 2, and replaces the tunnel identifier in the resv message 2 with the RSVP-TE label of the node B, therefore, the resv message 2 is updated to a resv message 1, and the resv message 1 is sent to the node A.

After receiving the resv message 1, the node A stores the RSVP-TE label of the node B. In this way, the entire tunnel is established.

Figure 7A:
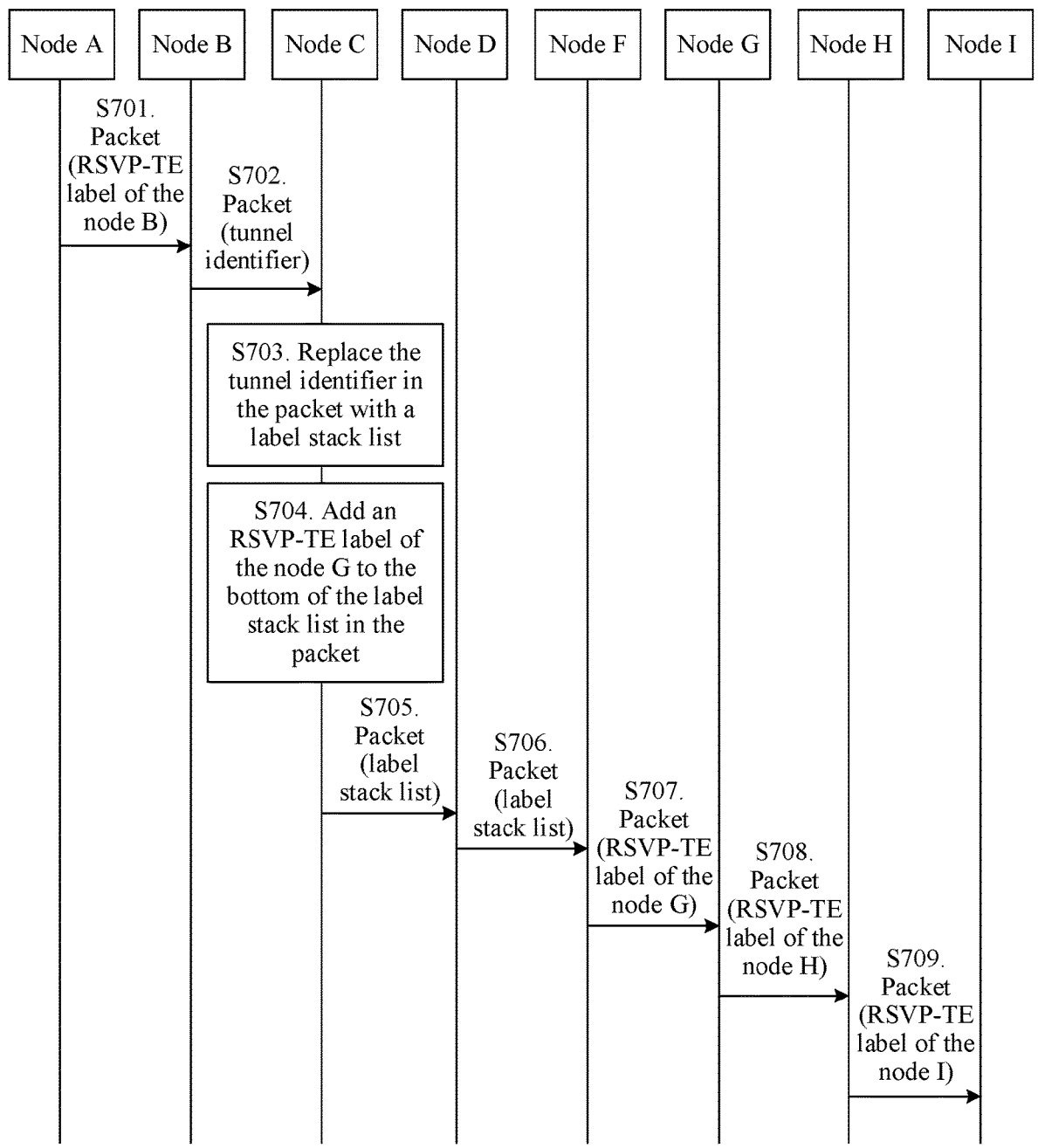
FIG. 7A and FIG. 7B are schematic flowcharts of a packet transmission method in a scenario in which an RSVP-TE tunnel traverses an SR-TE tunnel according to an embodiment of this application.
Figure 7B:
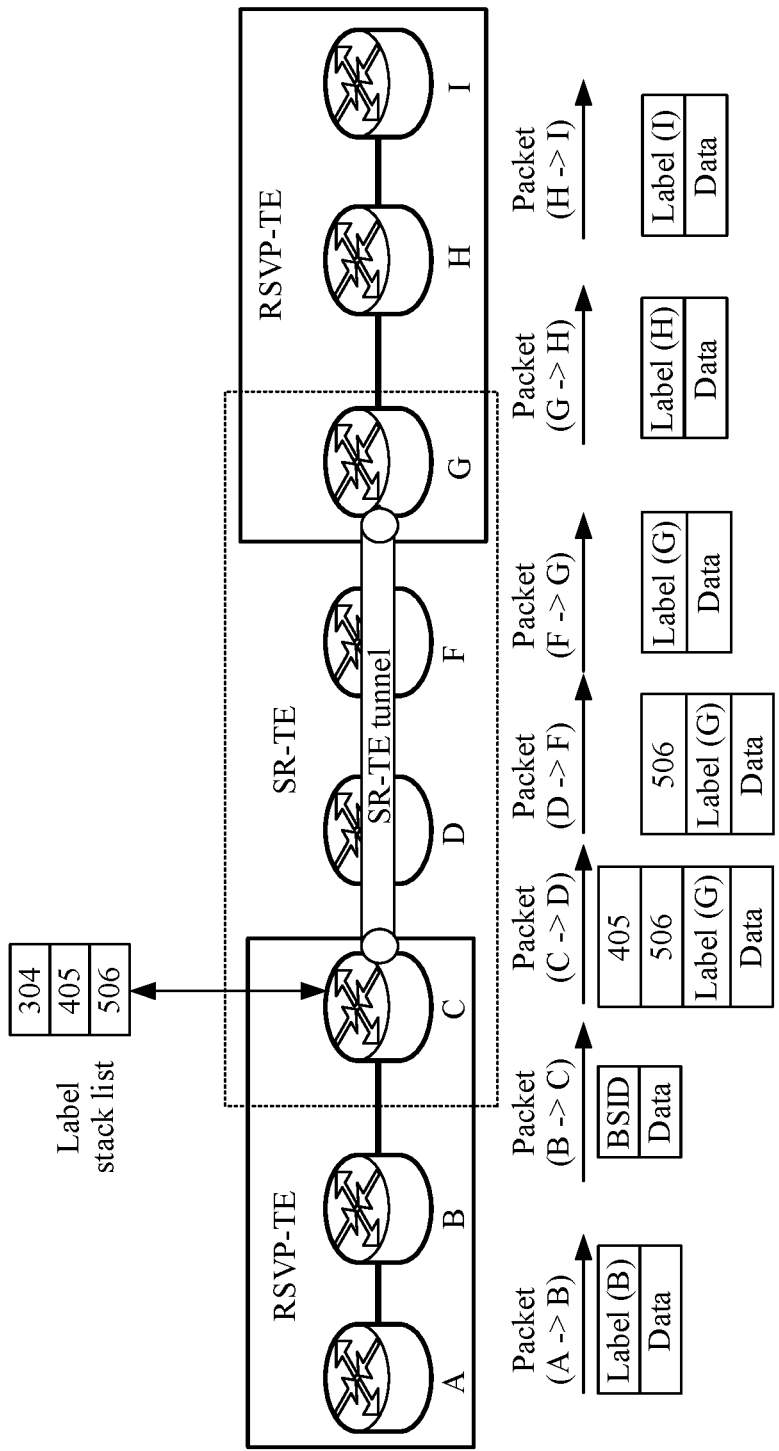

After completing establishment of the tunnel, the node A may send a packet to the node I by using the established tunnel in the following manner, as shown in FIG. 7A and FIG. 7B.

S701. The node A sends a packet to the next-hop node B, where the packet carries the RSVP-TE label of the node B.

S702. After receiving the packet, the node B replaces the label of the node B in the packet with the tunnel identifier, for example, a B SID, and sends an updated packet to the node C.

S703. After receiving the packet sent by the node B, the node C replaces the tunnel identifier in the packet with the label stack list based on the stored association relationship between the tunnel identifier and the label stack list.

The label stack list sequentially includes the adjacency label of the link between the node C and the node D, the adjacency label of the link between the node D and the node F, and the adjacency label of the link between the node F and the node G.

Specifically, the node C searches, based on the association relationship, for the label stack list associated with the tunnel identifier in the packet, and then replaces the tunnel identifier with the found label stack list.

S704. The node C adds the RSVP-TE label of the node G to the bottom of the label stack list in the packet.

S705. The node C determines the link between the node C and the node D based on the adjacency label (the adjacency label 304 of the link between the node C and the node D) on the stack top of the label stack list, and sends an updated packet to the node D after removing the adjacency label 304 on the stack top.

S706. After receiving the packet sent by the node C, the node D determines the link between the node D and the node F based on the adjacency label 405 on the stack top of the label stack list in the packet, and sends an updated packet to the node F after removing the adjacency label 405 on the stack top.

S707. After receiving the packet sent by the node D, the node F determines the link between the node F and the node G based on the adjacency label 506 on the stack top of the label stack list in the packet, and sends an updated packet to the node G after removing the adjacency label 506 on the stack top.

S708. After receiving the packet sent by the node F, the node G determines that the label in the packet is the RSVP-TE label of the node G, replaces the RSVP-TE label of the node G in the packet with the RSVP-TE label of the node H, and sends an updated packet to the node H.

S709. After receiving the packet sent by the node G, the node H determines that the label in the packet is the RSVP-TE label of the node H, replaces the RSVP-TE label of the node H in the packet with the RSVP-TE label of the node I, and sends an updated packet to the node I. Therefore, after receiving the packet sent by the node H, the node I determines that the label in the packet is the RSVP-TE label of the node I, deletes the RSVP-TE label of the node I from the packet, and continues subsequent forwarding.

Figure 8:
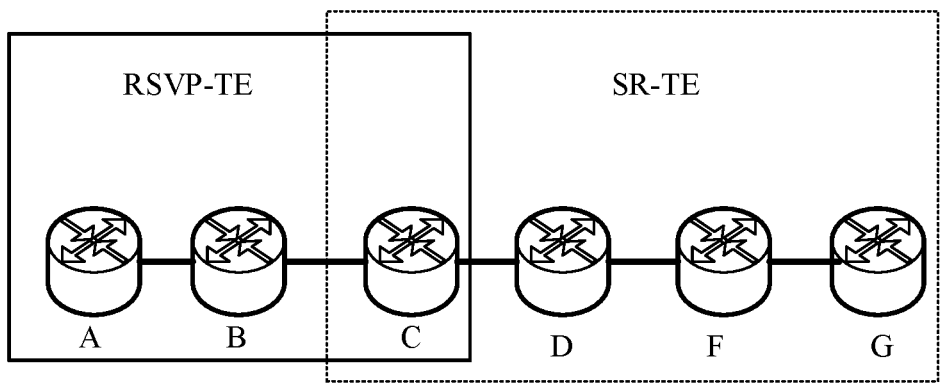
FIG. 8 is a schematic architectural diagram of a scenario in which an RSVP-TE tunnel is stitched to an SR-TE tunnel according to an embodiment of this application.

FIG. 8 shows the scenario in which RSVP-TE is stitched to SR-TE.

RSVP-TE nodes include a node A and a node B. SR-TE nodes include a node D, a node F, and a node G. An RSVP-TE and SR-TE node includes a node C. The node A is used as an ingress node of a to-be-established tunnel, and the node G is an egress node of the to-be-established tunnel. A difference between an embodiment corresponding to FIG. 8 and the embodiment corresponding to FIG. 5 lies in that the node G does not support RSVP-TE, and the node G is the egress node of the to-be-established tunnel.

Figure 9A:
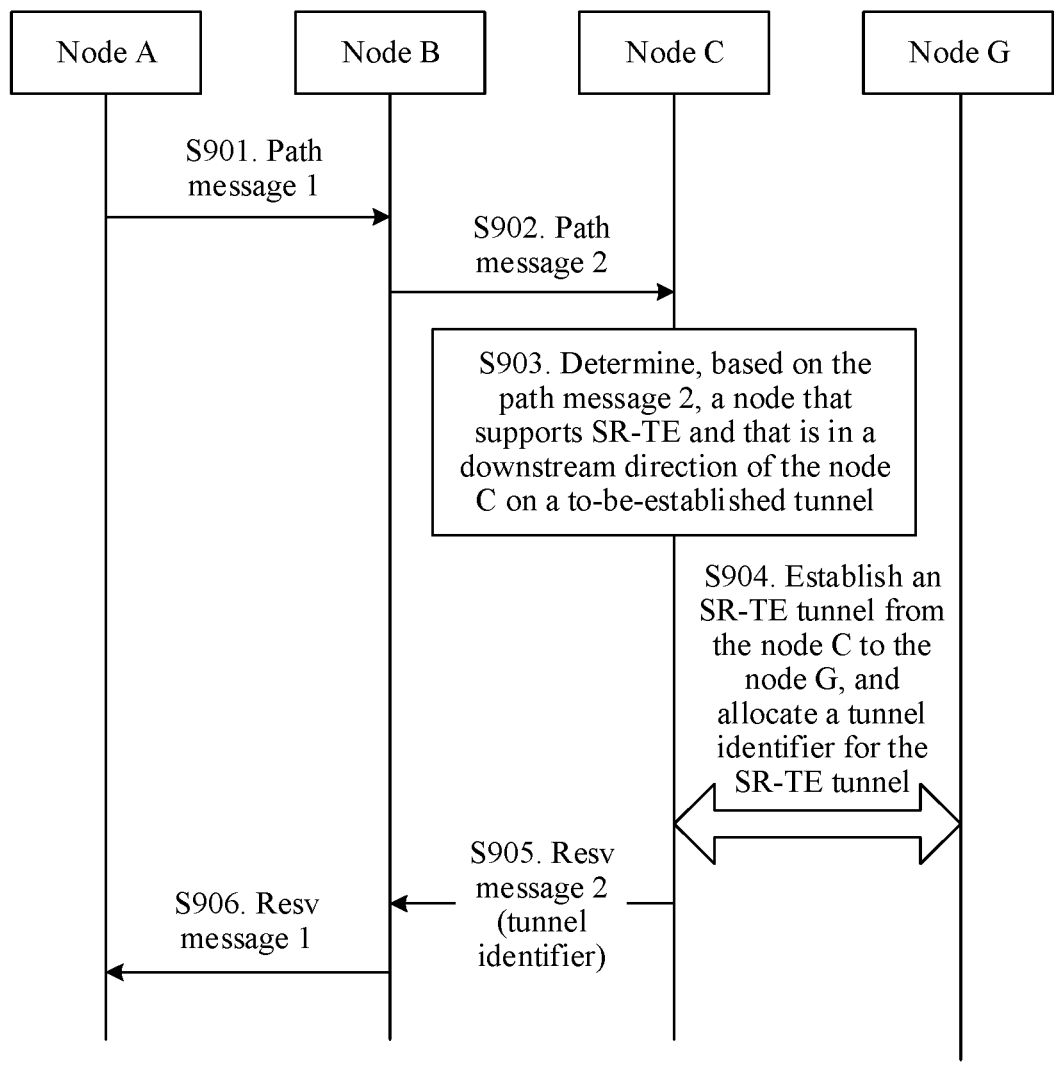
FIG. 9A and FIG. 9B are schematic flowcharts of a tunnel establishment method in a scenario in which an RSVP-TE tunnel is stitched to an SR-TE tunnel according to an embodiment of this application.
Figure 9B:
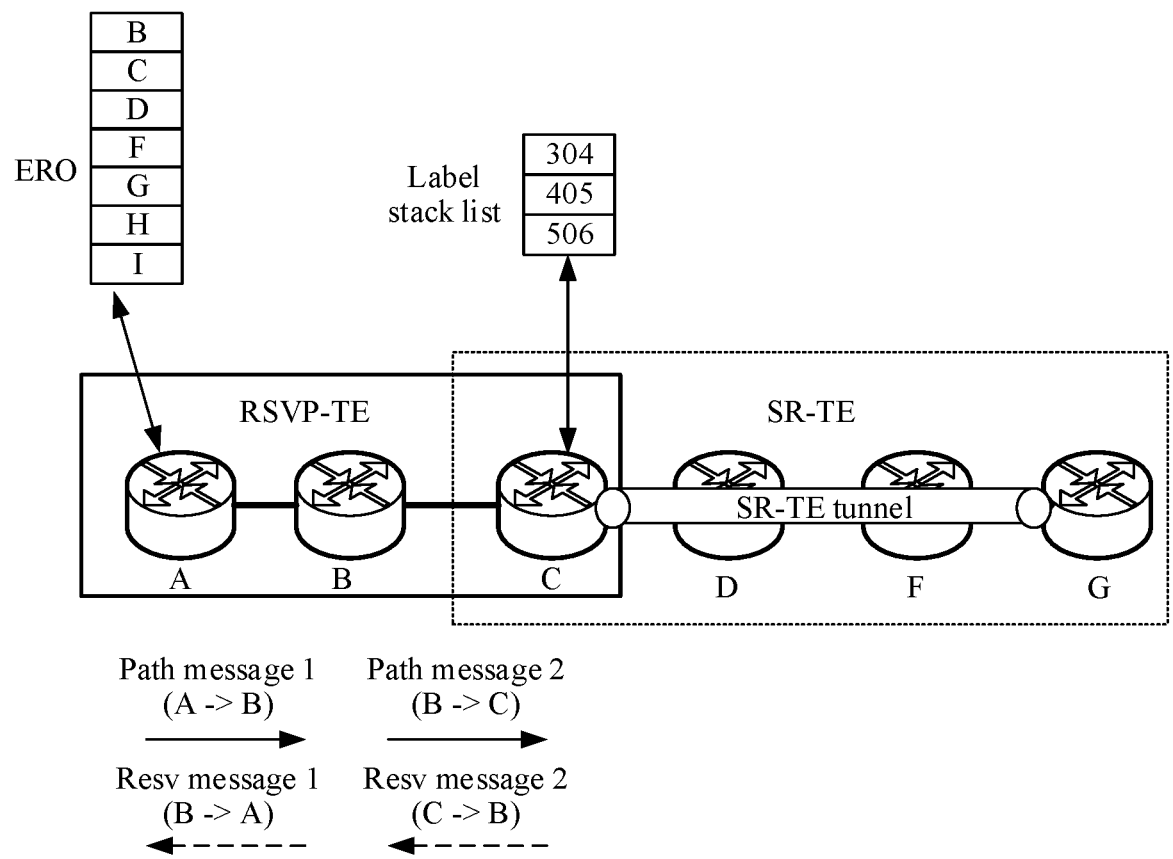

A specific tunnel establishment solution is shown in FIG. 9A and FIG. 9B.

The node A calculates a path for a to-be-established tunnel from the node A to the node G based on CSPF. The path specifies an IP address of each hop along the path. The path obtained through calculation is A→B→C→D→F→G. The node A uses an IP address list obtained through calculation based on CSPF as explicit route object (ERO) information, and constructs a path message (Msg) 1. Alternatively, the node A may trigger a controller to calculate a path from the node A to the node G based on CSPF, and then send an IP address list obtained through calculation that is used as ERO information to the node A, so that the node A constructs a path message 1 based on the received ERO information.

For S901 to S904, refer to S601 to S604. Details are not described herein.

S905. The node C determines that the node G is the egress node of the to-be-established tunnel, adds a tunnel identifier to a resv message 2, and send the resv message 2 to the node B, where the tunnel identifier is used as an RSVP-TE label of the node C.

S906. After receiving the resv message 2, the node B allocates an RSVP-TE label to the node B, stores the tunnel identifier in the resv message 2, and replaces the tunnel identifier in the resv message 2 with the RSVP-TE label of the node B, in other words, the resv message 2 is updated to a resv message 1, and the resv message 1 is sent to the node A.

After receiving the resv message 1, the node A stores the RSVP-TE label of the node B. In this way, the entire tunnel is established.

Figure 10A:
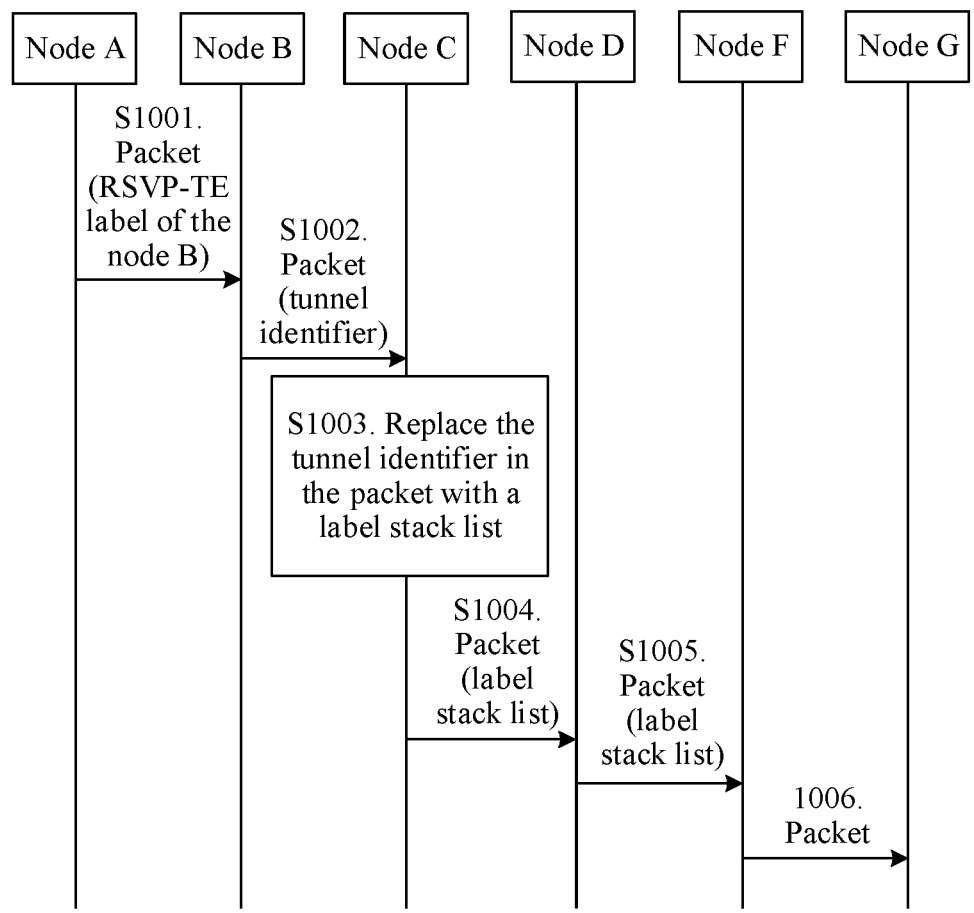
FIG. 10A and FIG. 10B are schematic flowcharts of a packet transmission method in a scenario in which an RSVP-TE tunnel is stitched to an SR-TE tunnel according to an embodiment of this application.
Figure 10B:
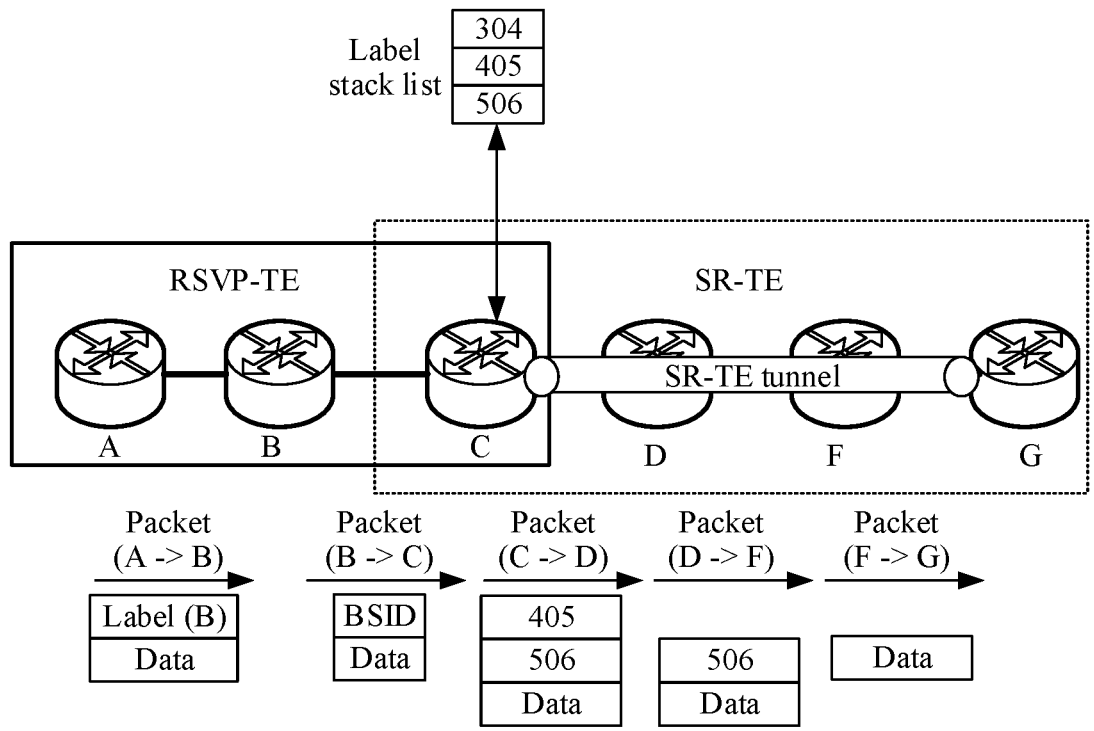

After completing establishment of the tunnel, the node A may send a packet to the node G by using the established tunnel in the following manner, as shown in FIG. 10A and FIG. 10B.

For S1001 to S1003, refer to S701 to S703. Details are not described again herein.

For S1004 to S1006, refer to S705 to S707. Details are not described again herein. After receiving the packet sent by the node F, the node G continues subsequent forwarding.

Figure 11:
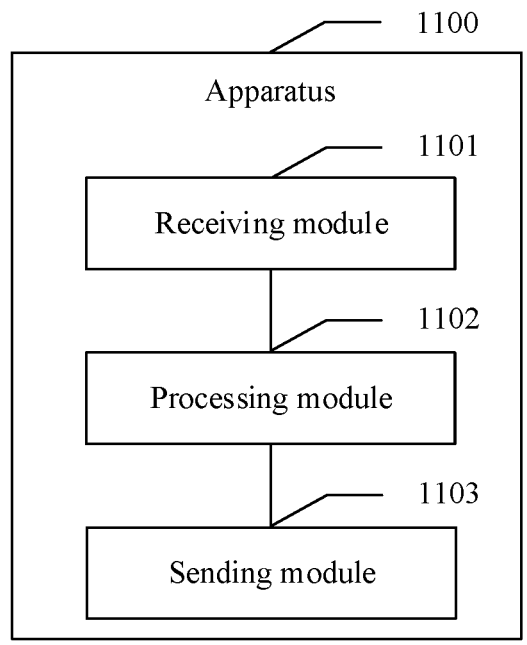
FIG. 11 is a schematic structural diagram of an apparatus 1100 according to an embodiment of this application.

Based on a same inventive concept as the method embodiment, an embodiment of this application further provides an apparatus. Referring to FIG. 11, an apparatus 1100 is applied to a network device. The network device may be a stitching node of RSVP-TE and SR-TE, for example, the first node in the embodiment corresponding to FIG. 4 or the node C in the embodiments corresponding to FIG. 5 and FIG. 8. The apparatus 1100 may be specifically a processor, a chip, a chip system, a function module, or the like in the network device. The apparatus 1100 may include a receiving module 1101, a processing module 1102, and a sending module 1103. The processing module 1102 is configured to control and manage an action of the apparatus 1100. The receiving module 1101 is configured to receive a request message or a packet. The sending module 1103 is configured to send a response message or a packet. The processing module 1102 is configured to process the request message or the packet received by the receiving module 1101. The processing module 1102 may be further configured to indicate a processing process related to the network device (for example, the first node or the node C) in any one of the foregoing embodiments and/or another process of the technical solution described in this application. The apparatus may further include a storage module (not shown in FIG. 11), where the storage module is configured to store the association relationship between the tunnel identifier and the label stack list.

That the apparatus 1100 is applied to the first node is used as an example. The receiving module 1101 is configured to receive a first request message sent by a previous-hop node (for details, refer to related descriptions in FIG. 4 to FIG. 10B, and details are not described herein), where the first request message is used to request to obtain an RSVP-TE label of the first node, the first request message includes path information of the to-be-established tunnel, the path information of the to-be-established tunnel is used to indicate a path of the to-be-established tunnel, the previous-hop node is a previous-hop node of the first node on the path of the to-be-established tunnel, the first node supports RSVP-TE and segment routing-traffic engineering SR-TE, and the previous-hop node supports RSVP-TE. The processing module 1102 is configured to: when it is determined that at least one node in downstream nodes of the first node on the path of the to-be-established tunnel supports SR-TE, establish an SR-TE tunnel from the first node to a second node in the at least one node, and generate a tunnel identifier used to identify the SR-TE tunnel, where the first node is an ingress node of the SR-TE tunnel, and the second node is an egress node of the SR-TE tunnel. The sending module 1103 is configured to send a first response message to the previous-hop node, where the first response message includes the tunnel identifier, and the tunnel identifier is used as the RSVP-TE label of the first node.

The embodiments of this application may be applied to at least two scenarios.

In a first scenario, the second node is the egress node of the to-be-established tunnel, and none of the at least one node supports RSVP-TE.

In a second scenario, only the second node in the at least one node supports RSVP-TE, and the second node is an intermediate node of the to-be-established tunnel.

In any scenario, in a possible embodiments of an implementation, that the processing module 1102 establishes an SR-TE tunnel from the first node to a second node in the at least one node, and generates a tunnel identifier used to identify the SR-TE tunnel may be implemented in the following manner:

obtaining, based on the path information of the to-be-established tunnel, at least one adjacency label corresponding to every two adjacent nodes on the SR-TE tunnel between the first node and the second node; and generating a label stack list of the SR-TE tunnel based on the at least one adjacency label, and generating the tunnel identifier mapped to the label stack list; and storing an association relationship between the tunnel identifier and the label stack list in the storage module.

In the second scenario, in a possible embodiments of an implementation, the sending module 1103 is further configured to: before sending the first response message to the previous-hop node, send a second request message to the second node through the SR-TE tunnel, where the second request message is used to request to obtain an RSVP-TE label of the second node. The receiving module 1101 is further configured to receive a second response message sent by the second node, where the second response message includes the RSVP-TE label of the second node.

In any scenario, in a possible embodiment of an implementation, the receiving module 1101 is further configured to receive a packet sent by the previous-hop node, where the packet carries the tunnel identifier. The processing module 1102 is further configured to replace the tunnel identifier in the packet with the label stack list based on the association relationship between the tunnel identifier and the label stack list. The sending module 1103 is further configured to send an updated packet to a next-hop node of the first node on the to-be-established tunnel.

In the second scenario, in a possible embodiment of an implementation, when only the second node in the at least one node supports RSVP-TE, and the second node is the intermediate node on the to-be-established tunnel, the processing module 1102 is further configured to: after replacing the tunnel identifier in the packet with the label stack list, encapsulate the RSVP-TE label of the second node at the bottom of the label stack list in the packet.

Figure 12:
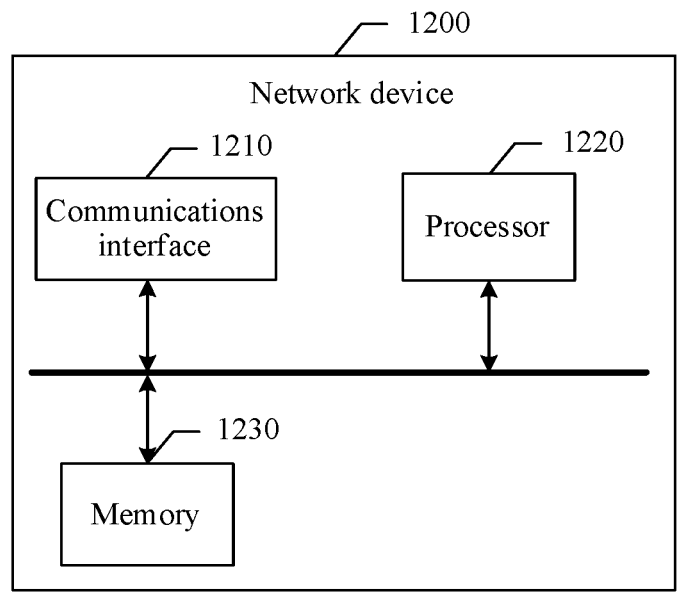
FIG. 12 is a schematic structural diagram of a network device 1200 according to an embodiment of this application.

An embodiment of this application further provides a structure of another network device. As shown in FIG. 12, a network device 1200 may include a communications interface 1210 and a processor 1220. Optionally, the network device 1200 may further include a memory 1230. The network device 1200 is a stitching node, for example, the first node or the node C in FIG. 4 to FIG. 10B. The memory 1230 may be disposed inside the network device, or may be disposed outside the network device 1200. The processing module 1102 shown in FIG. 11 may be implemented by the processor 1220. The receiving module 1101 and the sending module 1103 may be implemented by the communications interface 1210. The processor 1220 receives and sends a packet or a message by using the communications interface 1210, and is configured to implement any method performed by the network device (the first node or the node C) in FIG. 4 to FIG. 10B. During an embodiments of an implementation process, steps in a processing procedure may complete, by using an integrated logic circuit of hardware or an instruction in a form of software in the processor 1220, the method performed by the first node or the node C in FIG. 4 to FIG. 10B. For brevity, details are not described herein. Program code executed by the processor 1220 for implementing the foregoing method may store in the memory 1230. The memory 1230 is coupled to the processor 1220. The memory 1230 is further configured to store the association relationship between the tunnel identifier and the label stack list.

This embodiment of this application does not limit a specific connection medium between the communications interface 1210, the processor 1220, and the memory 1230. In this embodiment of this application, in FIG. 12, the memory 1230, the processor 1220, and the communications interface 1210 are connected by using a bus. The bus is represented by a thick line in FIG. 12, and a connection manner between other parts is merely an example for description, and imposes no limitation. The bus may be classified into an address bus, a data bus, a control bus, and the like. For ease of representation, only one thick line is used to represent the bus in FIG. 12, but this does not mean that there is only one bus or only one type of bus.

Figure 13:
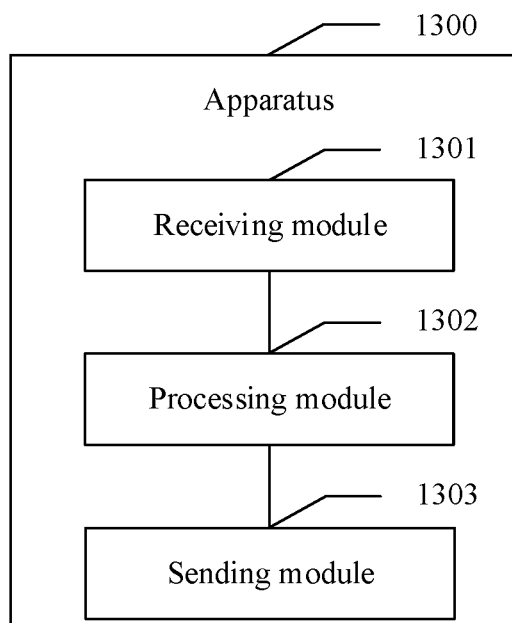
FIG. 13 is a schematic structural diagram of an apparatus 1300 according to an embodiment of this application.

Based on a same inventive concept as the method embodiment, an embodiment of this application further provides an apparatus. Referring to FIG. 13, an apparatus 1300 is applied to a network device. The network device may be a previous-hop node of a stitching node of RSVP-TE and SR-TE, for example, the previous-hop node of the first node in the embodiment corresponding to FIG. 4 or the node B in the embodiments corresponding to FIG. 5 to FIG. 10B. The apparatus 1300 may be specifically a processor, a chip, a chip system, a function module, or the like in the network device. The apparatus 1300 may include a receiving module 1301, a processing module 1302, and a sending module 1303. The processing module 1302 is configured to control and manage an action of the apparatus 1300. The receiving module 1301 is configured to receive a request message or a packet. The sending module 1303 is configured to send a response message or a packet. The processing module 1302 is configured to process the request message or the packet received by the receiving module 1301. The processing module 1302 may be further configured to indicate a processing process related to the network device (for example, the previous-hop node of the first node or the node B in FIG. 4 to FIG. 10B) in any one of the foregoing embodiments and/or another process of the technical solution described in this application.

The sending module 1303 is configured to send a request message to a next-hop node on a to-be-established tunnel, where the request message is used to request to obtain a resource reservation protocol-traffic engineering RSVP-TE label of the next-hop node, the request message includes path information of the to-be-established tunnel, the path information of the to-be-established tunnel is used to indicate a path of the to-be-established tunnel, the next-hop node is a next-hop node of the node on the path of the to-be-established tunnel, the node supports RSVP-TE, and the next-hop node supports RSVP-TE and segment routing-traffic engineering SR-TE. The receiving module 1301 is configured to receive a response message sent by the next-hop node, where the response message includes a tunnel identifier of the RSVP-TE label used as the node, and the tunnel identifier is used to identify an SR-TE tunnel established by the next-hop node on the path of the to-be-established tunnel.

In a possible embodiment of an implementation, the processing module 1302 is configured to: when the sending module 1303 sends a packet to the next-hop node, add the tunnel identifier used as the RSVP-TE label of the next-hop node to the packet. The sending module 1303 is further configured to send the packet that carries the tunnel identifier to the next-hop node.

Figure 14:
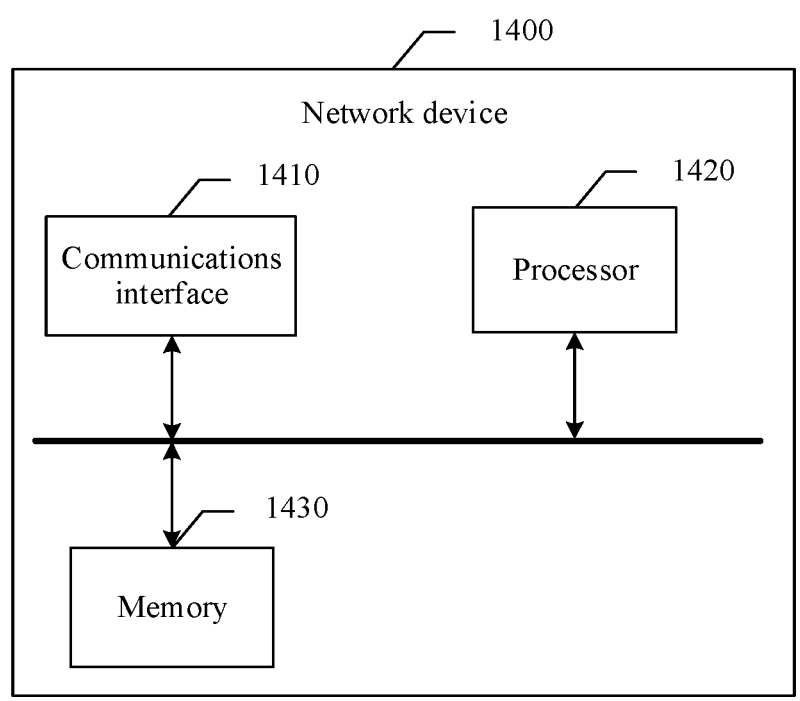
FIG. 14 is a schematic structural diagram of a network device 1400 according to an embodiment of this application.

An embodiment of this application further provides a structure of another network device. As shown in FIG. 14, a network device 1400 may include a communications interface 1410 and a processor 1420. Optionally, the network device 1400 may further include a memory 1430. The memory 1430 may be disposed inside the network device, or may be disposed outside the network device. The processing module 1302 shown in FIG. 13 may be implemented by the processor 1420. The receiving module 1301 and the sending module 1303 may be implemented by the communications interface 1410. The processor 1420 receives and sends a packet or a message by using the communications interface 1410, and is configured to implement any method performed by the network device (the previous-hop node of the first node or the node B) in FIG. 4 to FIG. 10B. During an embodiments of an implementation process, steps in a processing procedure may complete, by using an integrated logic circuit of hardware or an instruction in a form of software in the processor 1420, the method performed by the previous-hop node of the first node or the node B in FIG. 4 to FIG. 10B. For brevity, details are not described herein. Program code executed by the processor 1420 for implementing the foregoing method may store in the memory 1430. The memory 1430 is coupled to the processor 1420.

Any communications interface in the embodiments of this application may be a circuit, a bus, a transceiver, or any other apparatus that may be configured to exchange information, for example, the communications interface 1410 in the network device 1400. For example, the another apparatus may be a device connected to the network device 1400. For example, the another apparatus may be a previous-hop node, a next-hop node, or the like of the network device 1400.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

Couplings in the embodiments of this application are indirect couplings or communication connections between apparatuses, units, or modules, may be electrical, mechanical, or another form, and are used for information interaction between the apparatuses, the units, and the modules.

The processor 1420 may operate with the memory 1430 together. The memory 1430 may be a nonvolatile memory, for example, a hard disk drive (HDD) or a solid-state disk (SSD), or may be a volatile memory, for example, a random-access memory (RAM). The memory 1430 is any other medium that can be configured to carry or store expected program code that has an instruction or a data structure form, and that can be accessed by a computer, but is not limited thereto.

This embodiment of this application does not limit a specific connection medium between the communications interface 1410, the processor 1420, and the memory 1430. In this embodiment of this application, in FIG. 14, the memory 1430, the processor 1420, and the communications interface 1410 are connected by using a bus. The bus is represented by a thick line in FIG. 14, and a connection manner between other parts is merely an example for description, and imposes no limitation. The bus may be classified into an address bus, a data bus, a control bus, and the like. For ease of representation, only one thick line is used to represent the bus in FIG. 14, but this does not mean that there is only one bus or only one type of bus.

Based on the foregoing embodiments, an embodiment of this application further provides a computer storage medium. The storage medium stores a software program, and when read and executed by one or more processors, the software program may implement the method provided in any one or more of the foregoing embodiments. The computer storage medium may include: any medium that can store program code, such as a removable hard disk, a read-only memory, a random access memory, a magnetic disk, or an optical disc.

Based on the foregoing embodiments, an embodiment of this application further provides a chip. The chip includes a processor, configured to implement functions in any one or more of the foregoing embodiments, for example, configured to implement the method performed by the first node or the node C in FIG. 4 to FIG. 10B, or configured to implement the method performed by the previous-hop node of the first node or the node B in FIG. 4 to FIG. 10B. Optionally, the chip further includes a memory. The memory is configured to store a program instruction and data that are necessary and executed by the processor. The chip system may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (e.g., a system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

The foregoing descriptions are merely specific embodiments and implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first network device of a network system, comprising:
a memory comprising instructions;
one or more processors coupled to the memory, wherein the instructions, when executed by the one or more processors, cause the first network device to:
receive a first request message sent by a previous-hop network device, wherein the first request message requests a resource reservation protocol-traffic engineering (RSVP-TE) label from the first network device, the first request message comprises path information of a to-be-established tunnel, the path information of the to-be-established tunnel indicates a path of the to-be-established tunnel, the previous-hop network device is a previous-hop network device of the first network device on the path of the to-be-established tunnel, the first network device supports RSVP-TE and segment routing-traffic engineering (SR-TE), and the previous-hop network device supports RSVP-TE, when the first network device determines that at least one network device that is downstream of the first network device on the path of the to-be-established tunnel supports SR-TE, obtain a tunnel identifier that identifies an SR-TE tunnel, wherein the SR-TE tunnel is from the first network device to a second network device in the at least one network device, wherein the first network device is an ingress network device of the SR-TE tunnel, and the second network device is an egress network device of the SR-TE tunnel, and send a first response message to the previous-hop network device, wherein the first response message comprises the tunnel identifier used as the RSVP-TE label of the first network device.

2. The first network device according to claim 1, wherein the first network device is further caused to:

obtain, based on the path information of the to-be-established tunnel, at least one adjacency label corresponding to every two adjacent nodes on the SR-TE tunnel between the first network device and the second network device;

generate a label stack list of the SR-TE tunnel based on the at least one adjacency label;

generate the tunnel identifier mapped to the label stack list; and store an association relationship between the tunnel identifier and the label stack list.

3. The first network device according to claim 1, wherein the second network device is an egress network device of the to-be-established tunnel, and none of the at least one network device supports RSVP-TE.

4. The first network device according to claim 1, wherein only the second network device in the at least one network device supports RSVP-TE, and the second network device is an intermediate network device on the to-be-established tunnel; and before the first response message is sent by the first network device to the previous-hop network device, the first network device to:

send a second request message to the second network device through the SR-TE tunnel, wherein the second request message requests an RSVP-TE label of the second network device; and receive a second response message sent by the second network device, wherein the second response message comprises the RSVP-TE label of the second network device.

5. The first network device according to claim 4, wherein the one or more processors execute the instructions to further cause the first network device to:

receive a packet sent by the previous-hop network device, wherein the packet carries the tunnel identifier; and replace the tunnel identifier in the packet with a label stack list based on an association relationship between the tunnel identifier and the label stack list, and send the packet that has been updated to a next-hop network device of the first network device on the to-be-established tunnel.

6. The first network device according to claim 5, wherein when only the second network device in the at least one network device supports RSVP-TE, and the second network device is the intermediate network device on the to-be-established tunnel, after the first network device replaces the tunnel identifier in the packet with the label stack list, the first network device to:

encapsulate the RSVP-TE label of the second network device at the bottom of the label stack list in the packet.

7. A network device comprising:

a memory comprising instructions;

one or more processors coupled to the memory, wherein the instructions, when executed by the one or more processors, cause the network device to:

send a request message to a next-hop network device on a to-be-established tunnel, wherein the request message requests a resource reservation protocol-traffic engineering (RSVP-TE) label from the next-hop network device, the request message comprises path information of the to-be-established tunnel, the path information of the to-be-established tunnel indicates a path of the to-be-established tunnel, the next-hop network device is a next-hop network device of the network device on the path of the to-be-established tunnel, the network device supports RSVP-TE, and the next-hop network device supports RSVP-TE and segment routing-traffic engineering (SR-TE), and receive a response message sent by the next-hop network device, wherein the response message comprises a tunnel identifier used as the RSVP-TE label of the network device, and the tunnel identifier identifies an SR-TE tunnel established by the next-hop network device on the path of the to-be-established tunnel.

8. The network device according to claim 7, wherein the instructions, when executed by the one or more processors, further cause the network device to:

when the network device sends a packet to the next-hop network device, add the tunnel identifier used as the RSVP-TE label of the next-hop network device to the packet, and send the packet to the next-hop network device.

9. A tunnel establishment system, comprising:

a previous-hop network device comprising a memory storing instructions and one or more processors configured to execute the instructions to cause the previous-hop network device to: send a first request message to a first network device on a to-be-established tunnel to obtain a resource reservation protocol-traffic engineering (RSVP-TE) label of the first network device, the first request message comprises path information of the to-be-established tunnel, the path information of the to-be-established tunnel indicates a path of the to-be-established tunnel, the previous-hop network device is a previous-hop network device of the first network device on the path of the to-be-established tunnel, the previous-hop network device supports RSVP-TE, and the first network device supports RSVP-TE and segment routing-traffic engineering (SR-TE);

the first network device comprising a second memory storing second instructions and one or more second processors configured to execute the second instructions to cause the first network device to:

receive the first request message sent by the previous-hop network device, when the first network device determines that at least one network device in downstream network devices of the first network device on the path of the to-be-established tunnel supports SR-TE, the first network device to obtain a tunnel identifier that identifies an SR-TE tunnel, wherein the SR-TE tunnel is from the first network device to a second network device in the at least one network device, wherein the first network device is an ingress network device of the SR-TE tunnel, and the second network device is an egress network device of the SR-TE tunnel, and send a first response message to the previous-hop network device that comprises the tunnel identifier, and the tunnel identifier is used as the RSVP-TE label of the first network device; and wherein the one or more processors of the previous-hop network device are configured to execute the instructions to further cause the previous-hop network device to: further receive the first response message sent by a next-hop network device, wherein the tunnel identifier identifies an SR-TE tunnel established by the first network device on the path of the to-be-established tunnel.

* * * * *